US011401865B1

(12) United States Patent
Yeung et al.

(10) Patent No.: US 11,401,865 B1
(45) Date of Patent: *Aug. 2, 2022

(54) DIRECT DRIVE UNIT REMOVAL SYSTEM AND ASSOCIATED METHODS

(71) Applicant: BJ Energy Solutions, LLC, Houston, TX (US)

(72) Inventors: Tony Yeung, Houston, TX (US); Ricardo Rodriguez-Ramon, Houston, TX (US); Joseph Foster, Houston, TX (US); Nicholas Tew, Houston, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,390

(22) Filed: Apr. 14, 2022

Related U.S. Application Data

(60) Continuation of application No. 17/671,734, filed on Feb. 15, 2022, now Pat. No. 11,346,280, which is a continuation of application No. 17/204,338, filed on Mar. 17, 2021, now Pat. No. 11,319,878, which is a continuation of application No. 17/154,601, filed on Jan. 21, 2021, now Pat. No. 10,982,596, which is a division of application No. 17/122,433, filed on Dec. 15, 2020, now Pat. No. 10,961,912, which is a
(Continued)

(51) Int. Cl.
*F02C 7/20* (2006.01)
*F02C 7/32* (2006.01)
*F02C 7/36* (2006.01)
*E21B 43/26* (2006.01)

(52) U.S. Cl.
CPC ............ *F02C 7/20* (2013.01); *E21B 43/2607* (2020.05); *F02C 7/32* (2013.01); *F02C 7/36* (2013.01)

(58) Field of Classification Search
CPC ................. F02C 7/20; F02C 7/32; F02C 7/36
See application file for complete search history.

(56) References Cited

U.S. PATENT DOCUMENTS

| 2,498,229 A | 2/1950 | Adler |
| 2,535,703 A | 12/1950 | Smith et al. |
| 2,820,341 A | 1/1958 | Amann |

(Continued)

FOREIGN PATENT DOCUMENTS

| AU | 9609498 | 7/1999 |
| AU | 737970 | 9/2001 |

(Continued)

OTHER PUBLICATIONS

ResearchGate, Answer by Byron Woolridge, found at https://www.researchgate.net/post/How_can_we_improve_the_efficiency_of_the_gas_turbine_cycles, Jan. 1, 2013.
(Continued)

*Primary Examiner* — Ehud Gartenberg
*Assistant Examiner* — David P. Olynick
(74) *Attorney, Agent, or Firm* — Womble Bond Dickinson (US) LLP

(57) ABSTRACT

Described herein are embodiments of systems and methods for the removal of a direct drive unit (DDU) housed in an enclosure, such as a direct drive turbine (DDT) connected to a gearbox for driving a driveshaft connected to a pump for use in hydraulic fracturing operations.

11 Claims, 19 Drawing Sheets

Related U.S. Application Data division of application No. 15/929,924, filed on May 29, 2020, now Pat. No. 10,895,202.

(60) Provisional application No. 62/899,975, filed on Sep. 13, 2019.

(56) References Cited

U.S. PATENT DOCUMENTS

| | | |
|---|---|---|
| 2,868,004 A | 1/1959 | Runde |
| 2,940,377 A | 6/1960 | Darnell et al. |
| 2,947,141 A | 8/1960 | Russ |
| 3,068,796 A | 12/1962 | Pfluger et al. |
| 3,191,517 A | 6/1965 | Solzman |
| 3,257,031 A | 6/1966 | Dietz |
| 3,274,768 A | 9/1966 | Klein |
| 3,378,074 A | 4/1968 | Kiel |
| 3,382,671 A | 5/1968 | Ehni, III |
| 3,463,612 A | 8/1969 | Whitsel |
| 3,550,696 A | 12/1970 | Kenneday |
| 3,586,459 A | 6/1971 | Zerlauth |
| 3,632,222 A | 1/1972 | Cronstedt |
| 3,656,582 A | 4/1972 | Alcock |
| 3,739,872 A | 6/1973 | McNair |
| 3,759,063 A | 9/1973 | Bendall |
| 3,765,173 A | 10/1973 | Harris |
| 3,771,916 A | 11/1973 | Flanigan et al. |
| 3,773,438 A | 11/1973 | Hall et al. |
| 3,786,835 A | 1/1974 | Finger |
| 3,791,682 A | 2/1974 | Mitchell |
| 3,796,045 A | 3/1974 | Foster |
| 3,814,549 A | 6/1974 | Cronstedt |
| 3,820,922 A | 6/1974 | Buse et al. |
| 3,963,372 A | 6/1976 | McLain et al. |
| 4,010,613 A | 3/1977 | McInerney |
| 4,031,407 A | 6/1977 | Reed |
| 4,059,045 A | 11/1977 | McClain |
| 4,086,976 A | 5/1978 | Holm et al. |
| 4,117,342 A | 9/1978 | Melley, Jr. |
| 4,173,121 A | 11/1979 | Yu |
| 4,204,808 A | 5/1980 | Reese et al. |
| 4,209,079 A | 6/1980 | Marchal et al. |
| 4,209,979 A | 7/1980 | Woodhouse et al. |
| 4,222,229 A | 9/1980 | Uram |
| 4,269,569 A | 5/1981 | Hoover |
| 4,311,395 A | 1/1982 | Douthitt et al. |
| 4,330,237 A | 5/1982 | Battah |
| 4,341,508 A | 7/1982 | Rambin, Jr. |
| 4,357,027 A | 11/1982 | Zeitlow |
| 4,383,478 A | 5/1983 | Jones |
| 4,402,504 A | 9/1983 | Christian |
| 4,457,325 A | 7/1984 | Green |
| 4,470,771 A | 9/1984 | Hall et al. |
| 4,483,684 A | 11/1984 | Black |
| 4,505,650 A | 3/1985 | Hannett et al. |
| 4,574,880 A | 3/1986 | Handke |
| 4,584,654 A | 4/1986 | Crane |
| 4,672,813 A | 6/1987 | David |
| 4,754,607 A | 7/1988 | Mackay |
| 4,782,244 A | 11/1988 | Wakimoto |
| 4,796,777 A | 1/1989 | Keller |
| 4,869,209 A | 9/1989 | Young |
| 4,913,625 A | 4/1990 | Gerlowski |
| 4,983,259 A | 1/1991 | Duncan |
| 4,990,058 A | 2/1991 | Eslinger |
| 5,135,361 A | 8/1992 | Dion |
| 5,245,970 A | 9/1993 | Iwaszkiewicz et al. |
| 5,291,842 A | 3/1994 | Sallstrom et al. |
| 5,362,219 A | 11/1994 | Paul et al. |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,626,103 A | 5/1997 | Haws et al. |
| 5,651,400 A | 7/1997 | Corts et al. |
| 5,678,460 A | 10/1997 | Walkowc |
| 5,717,172 A | 2/1998 | Griffin, Jr. et al. |
| 5,720,598 A | 2/1998 | de Chizzelle |
| 5,839,888 A | 11/1998 | Harrison |
| 5,846,062 A | 12/1998 | Yanagisawa et al. |
| 5,983,962 A | 11/1999 | Gerardot |
| 6,041,856 A | 3/2000 | Thrasher et al. |
| 6,050,080 A | 4/2000 | Horner |
| 6,067,962 A | 5/2000 | Bartley et al. |
| 6,071,188 A | 6/2000 | O'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,530,224 B1 | 3/2003 | Conchier |
| 6,543,395 B2 | 4/2003 | Green |
| 6,655,922 B1 | 12/2003 | Flek |
| 6,765,304 B2 | 7/2004 | Baten et al. |
| 6,786,051 B2 | 9/2004 | Kristich et al. |
| 6,851,514 B2 | 2/2005 | Han et al. |
| 6,859,740 B2 | 2/2005 | Stephenson et al. |
| 6,901,735 B2 | 6/2005 | Lohn |
| 7,007,966 B2 | 3/2006 | Campion |
| 7,065,953 B1 | 6/2006 | Kopko |
| 7,143,016 B1 | 11/2006 | Discenzo et al. |
| 7,222,015 B2 | 5/2007 | Davis et al. |
| 7,388,303 B2 | 6/2008 | Seiver |
| 7,404,294 B2 | 7/2008 | Sundin |
| 7,442,239 B2 | 10/2008 | Armstrong et al. |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,845,413 B2 | 12/2010 | Shampine et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,980,357 B2 | 7/2011 | Edwards |
| 8,056,635 B2 | 11/2011 | Shampine et al. |
| 8,083,504 B2 | 12/2011 | Williams et al. |
| 8,186,334 B2 | 5/2012 | Ooyama |
| 8,196,555 B2 | 6/2012 | Ikeda et al. |
| 8,202,354 B2 | 6/2012 | Iijima |
| 8,316,936 B2 | 11/2012 | Roddy et al. |
| 8,336,631 B2 | 12/2012 | Shampine et al. |
| 8,414,673 B2 | 4/2013 | Raje et al. |
| 8,469,826 B2 | 6/2013 | Brosowske |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,656,990 B2 | 2/2014 | Kajaria et al. |
| 8,672,606 B2 | 3/2014 | Glynn et al. |
| 8,707,853 B1 | 4/2014 | Dille et al. |
| 8,714,253 B2 | 5/2014 | Sherwood et al. |
| 8,757,918 B2 | 6/2014 | Ramnarain et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,186 B2 | 10/2014 | Shampine et al. |
| 8,851,441 B2 | 10/2014 | Acuna et al. |
| 8,905,056 B2 | 12/2014 | Kendrick |
| 8,951,019 B2 | 2/2015 | Hains et al. |
| 8,973,560 B2 | 3/2015 | Krug |

(56) References Cited

U.S. PATENT DOCUMENTS

| | | |
|---|---|---|
| 8,997,904 B2 | 4/2015 | Cryer et al. |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oering et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| 9,893,500 B2 | 2/2018 | Oehring et al. |
| 9,893,660 B2 | 2/2018 | Peterson et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steflenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,316,832 B2 | 6/2019 | Byrne |
| 10,317,875 B2 | 6/2019 | Pandurangan |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,662,749 B1 | 5/2020 | Hill et al. |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,907,459 B1 | 2/2021 | Yeung et al. |
| 10,927,774 B2 | 2/2021 | Cai et al. |
| 10,954,770 B1 | 3/2021 | Yeung et al. |
| 10,954,855 B1 | 3/2021 | Ji et al. |
| 10,961,614 B1 | 3/2021 | Yeung et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,892,596 B2 | 4/2021 | Yeung et al. |
| 10,968,837 B1 | 4/2021 | Yeung et al. |
| 10,982,523 B1 | 4/2021 | Hill et al. |
| 10,989,019 B2 | 4/2021 | Cai et al. |
| 10,989,180 B2 | 4/2021 | Yeung et al. |

(56) References Cited

U.S. PATENT DOCUMENTS

| | | | |
|---|---|---|---|
| 10,995,564 B2 | 5/2021 | Miller et al. | |
| 11,002,189 B2 | 5/2021 | Yeung et al. | |
| 11,015,423 B1 | 5/2021 | Yeung et al. | |
| 11,015,536 B2 | 5/2021 | Yeung et al. | |
| 11,015,594 B2 | 5/2021 | Yeung et al. | |
| 11,022,526 B1 | 6/2021 | Yeung et al. | |
| 11,028,677 B1 | 6/2021 | Yeung et al. | |
| 11,035,214 B2 | 6/2021 | Cui et al. | |
| 11,047,379 B1 | 6/2021 | Li et al. | |
| 10,895,202 B1 | 7/2021 | Yeung et al. | |
| 11,053,853 B2 | 7/2021 | Li et al. | |
| 11,060,455 B1 | 7/2021 | Yeung et al. | |
| 11,085,281 B1 | 8/2021 | Yeung et al. | |
| 11,092,152 B2 | 8/2021 | Yeung et al. | |
| 11,098,651 B1 | 8/2021 | Yeung et al. | |
| 11,105,250 B1 | 8/2021 | Zhang et al. | |
| 11,105,266 B2 | 8/2021 | Zhou et al. | |
| 11,109,508 B1 | 8/2021 | Yeung et al. | |
| 11,111,768 B1 | 9/2021 | Yeung et al. | |
| 11,125,066 B1 | 9/2021 | Yeung et al. | |
| 11,125,156 B2 | 9/2021 | Zhang et al. | |
| 11,129,295 B1 | 9/2021 | Yeung et al. | |
| 11,143,000 B2 | 10/2021 | Li et al. | |
| 11,143,006 B1 | 10/2021 | Zhang et al. | |
| 11,149,533 B1 | 10/2021 | Yeung et al. | |
| 11,149,726 B1 | 10/2021 | Yeung et al. | |
| 11,156,159 B1 | 10/2021 | Yeung et al. | |
| 11,174,716 B1 | 11/2021 | Yeung et al. | |
| 11,193,360 B1 | 12/2021 | Yeung et al. | |
| 11,193,361 B1 | 12/2021 | Yeung et al. | |
| 11,205,880 B1 | 12/2021 | Yeung et al. | |
| 11,205,881 B2 | 12/2021 | Yeung et al. | |
| 11,208,879 B1 | 12/2021 | Yeung et al. | |
| 11,208,953 B1 | 12/2021 | Yeung et al. | |
| 11,220,895 B1 | 1/2022 | Yeung et al. | |
| 11,236,739 B2 | 2/2022 | Yeung et al. | |
| 11,242,737 B2 | 2/2022 | Zhang et al. | |
| 11,243,509 B2 | 2/2022 | Cai et al. | |
| 11,251,650 B1 | 2/2022 | Liu et al. | |
| 11,268,346 B2 | 3/2022 | Yeung et al. | |
| 11,346,200 B2 | 5/2022 | Cai et al. | |
| 2002/0126922 A1* | 9/2002 | Cheng | F16C 32/0666 384/1 |
| 2003/0061819 A1* | 4/2003 | Kuroki | F16M 5/00 60/797 |
| 2004/0016245 A1 | 1/2004 | Pierson | |
| 2004/0074238 A1 | 4/2004 | Wantanabe et al. | |
| 2004/0076526 A1 | 4/2004 | Fukano et al. | |
| 2004/0187950 A1 | 9/2004 | Cohen et al. | |
| 2004/0219040 A1 | 11/2004 | Kugelev et al. | |
| 2005/0051322 A1 | 3/2005 | Speer | |
| 2005/0139286 A1 | 6/2005 | Poulter | |
| 2005/0196298 A1 | 9/2005 | Manning | |
| 2005/0226754 A1 | 10/2005 | Orr et al. | |
| 2005/0274134 A1 | 12/2005 | Ryu et al. | |
| 2006/0061091 A1 | 3/2006 | Osterloh | |
| 2006/0062914 A1 | 3/2006 | Garg et al. | |
| 2006/0196251 A1 | 9/2006 | Richey | |
| 2006/0211356 A1 | 9/2006 | Grassman | |
| 2006/0260331 A1 | 11/2006 | Andreychuk | |
| 2006/0272333 A1 | 12/2006 | Sundin | |
| 2007/0029090 A1 | 2/2007 | Andreychuk et al. | |
| 2007/0066406 A1 | 3/2007 | Keller et al. | |
| 2007/0107981 A1 | 5/2007 | Sicotte | |
| 2007/0125544 A1 | 6/2007 | Robinson et al. | |
| 2007/0181212 A1 | 8/2007 | Fell | |
| 2007/0277982 A1 | 12/2007 | Shampine et al. | |
| 2007/0295569 A1 | 12/2007 | Manzoor et al. | |
| 2008/0006089 A1 | 1/2008 | Adnan et al. | |
| 2008/0098891 A1 | 5/2008 | Feher | |
| 2008/0161974 A1 | 7/2008 | Alston | |
| 2008/0264625 A1 | 10/2008 | Ochoa | |
| 2008/0264649 A1 | 10/2008 | Crawford | |
| 2009/0064685 A1 | 3/2009 | Busekros et al. | |
| 2009/0068031 A1 | 3/2009 | Gambier et al. | |
| 2009/0092510 A1 | 4/2009 | Williams et al. | |
| 2009/0124191 A1 | 5/2009 | Van Becelaere et al. | |
| 2009/0249794 A1 | 10/2009 | Wilkes et al. | |
| 2009/0308602 A1 | 12/2009 | Bruins et al. | |
| 2010/0019626 A1 | 1/2010 | Stout et al. | |
| 2010/0071899 A1 | 3/2010 | Coquilleau et al. | |
| 2010/0218508 A1 | 9/2010 | Brown et al. | |
| 2010/0300683 A1 | 12/2010 | Looper et al. | |
| 2010/0310384 A1 | 12/2010 | Stephenson et al. | |
| 2011/0052423 A1 | 3/2011 | Gambier et al. | |
| 2011/0054704 A1 | 3/2011 | Karpman et al. | |
| 2011/0085924 A1 | 4/2011 | Shampine et al. | |
| 2011/0146244 A1 | 6/2011 | Farman et al. | |
| 2011/0146246 A1 | 6/2011 | Farman et al. | |
| 2011/0197988 A1 | 8/2011 | Van Vliet et al. | |
| 2011/0241888 A1 | 10/2011 | Lu et al. | |
| 2011/0265443 A1 | 11/2011 | Ansari | |
| 2011/0272158 A1 | 11/2011 | Neal | |
| 2012/0048242 A1 | 3/2012 | Sumilla et al. | |
| 2012/0137699 A1 | 6/2012 | Montagne et al. | |
| 2012/0179444 A1 | 7/2012 | Ganguly et al. | |
| 2012/0192542 A1 | 8/2012 | Chillar et al. | |
| 2012/0199001 A1 | 8/2012 | Chillar et al. | |
| 2012/0204627 A1 | 8/2012 | Anderl et al. | |
| 2012/0255734 A1 | 10/2012 | Coli et al. | |
| 2012/0310509 A1 | 12/2012 | Pardo et al. | |
| 2012/0324903 A1 | 12/2012 | Dewis et al. | |
| 2013/0068307 A1 | 3/2013 | Hains et al. | |
| 2013/0087045 A1 | 4/2013 | Sullivan et al. | |
| 2013/0087945 A1 | 4/2013 | Kusters et al. | |
| 2013/0134702 A1 | 5/2013 | Boraas et al. | |
| 2013/0189915 A1 | 7/2013 | Hazard | |
| 2013/0255953 A1 | 10/2013 | Tudor | |
| 2013/0259707 A1 | 10/2013 | Yin | |
| 2013/0284455 A1 | 10/2013 | Kajaria et al. | |
| 2013/0300341 A1 | 11/2013 | Gillette | |
| 2013/0306322 A1 | 11/2013 | Sanborn | |
| 2014/0010671 A1 | 1/2014 | Cryer et al. | |
| 2014/0013768 A1 | 1/2014 | Laing et al. | |
| 2014/0032082 A1 | 1/2014 | Gehrke et al. | |
| 2014/0044517 A1 | 2/2014 | Saha et al. | |
| 2014/0048253 A1 | 2/2014 | Andreychuk | |
| 2014/0090729 A1 | 4/2014 | Coulter et al. | |
| 2014/0090742 A1 | 4/2014 | Coskrey et al. | |
| 2014/0094105 A1 | 4/2014 | Lundh et al. | |
| 2014/0095114 A1 | 4/2014 | Thomeer et al. | |
| 2014/0095554 A1 | 4/2014 | Thomeer et al. | |
| 2014/0123621 A1 | 5/2014 | Driessens et al. | |
| 2014/0130422 A1 | 5/2014 | Laing et al. | |
| 2014/0138079 A1 | 5/2014 | Broussard et al. | |
| 2014/0144641 A1 | 5/2014 | Chandler | |
| 2014/0147291 A1 | 5/2014 | Burnette | |
| 2014/0158345 A1 | 6/2014 | Jang et al. | |
| 2014/0196459 A1 | 7/2014 | Futa et al. | |
| 2014/0216736 A1 | 8/2014 | Leugemors et al. | |
| 2014/0219824 A1 | 8/2014 | Burnette | |
| 2014/0250845 A1 | 9/2014 | Jackson et al. | |
| 2014/0251623 A1 | 9/2014 | Lestz et al. | |
| 2014/0277772 A1 | 9/2014 | Lopez et al. | |
| 2014/0290266 A1 | 10/2014 | Veilleux, Jr. et al. | |
| 2014/0318638 A1 | 10/2014 | Harwood et al. | |
| 2015/0027730 A1 | 1/2015 | Hall et al. | |
| 2015/0078924 A1 | 3/2015 | Zhang et al. | |
| 2015/0101344 A1 | 4/2015 | Jarrier et al. | |
| 2015/0114652 A1 | 4/2015 | Lestz et al. | |
| 2015/0129210 A1 | 5/2015 | Chong et al. | |
| 2015/0135659 A1 | 5/2015 | Jarrier et al. | |
| 2015/0159553 A1 | 6/2015 | Kippel et al. | |
| 2015/0192117 A1 | 7/2015 | Bridges | |
| 2015/0204148 A1 | 7/2015 | Liu et al. | |
| 2015/0204322 A1 | 7/2015 | Iund et al. | |
| 2015/0211512 A1 | 7/2015 | Wiegman et al. | |
| 2015/0217672 A1 | 8/2015 | Shampine et al. | |
| 2015/0226140 A1 | 8/2015 | Zhang et al. | |
| 2015/0252661 A1 | 9/2015 | Glass | |
| 2015/0275891 A1 | 10/2015 | Chong et al. | |
| 2015/0340864 A1 | 11/2015 | Compton | |
| 2015/0345385 A1 | 12/2015 | Santini | |
| 2015/0369351 A1 | 12/2015 | Hermann et al. | |

(56) References Cited

U.S. PATENT DOCUMENTS

| | | |
|---|---|---|
| 2016/0032703 A1 | 2/2016 | Broussard et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Megman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladron de Guevara |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0248034 A1 | 8/2017 | Dzieciol et al. |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckels et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |

(56) References Cited

U.S. PATENT DOCUMENTS

| | | |
|---|---|---|
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0132058 A1 | 4/2020 | Mollatt |
| 2020/0141219 A1 | 5/2020 | Oehring et al. |
| 2020/0141907 A1 | 5/2020 | Meek et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0199110 A1 | 7/2021 | Albert et al. |
| 2021/0222690 A1 | 7/2021 | Beisel |
| 2021/0246774 A1 | 8/2021 | Cui et al. |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372395 A1 | 12/2021 | Li et al. |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |

FOREIGN PATENT DOCUMENTS

| | | |
|---|---|---|
| CA | 2043184 | 8/1994 |
| CA | 2829762 | 9/2012 |
| CA | 2876687 A1 | 5/2014 |
| CA | 2693567 | 9/2014 |
| CA | 2876687 C | 4/2019 |
| CA | 2919175 | 3/2021 |
| CN | 2622404 | 6/2004 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 102182904 | 9/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |

(56) References Cited

FOREIGN PATENT DOCUMENTS

| | | |
|---|---|---|
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307   | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |
| CN | 103253839 A | 8/2013 |
| CN | 103277290 A | 9/2013 |
| CN | 103321782 A | 9/2013 |
| CN | 203170270 U | 9/2013 |
| CN | 203172509 U | 9/2013 |
| CN | 203175778 U | 9/2013 |
| CN | 203175787 U | 9/2013 |
| CN | 102849880 B | 10/2013 |
| CN | 203241231 U | 10/2013 |
| CN | 203244941 U | 10/2013 |
| CN | 203244942 U | 10/2013 |
| CN | 203303798 U | 11/2013 |
| CN | 102155172 B | 12/2013 |
| CN | 102729335 B | 12/2013 |
| CN | 103420532 A | 12/2013 |
| CN | 203321792 U | 12/2013 |
| CN | 203412658   | 1/2014 |
| CN | 203420697 U | 2/2014 |
| CN | 203480755 U | 3/2014 |
| CN | 103711437 A | 4/2014 |
| CN | 203531815 U | 4/2014 |
| CN | 203531871 U | 4/2014 |
| CN | 203531883 U | 4/2014 |
| CN | 203556164 U | 4/2014 |
| CN | 203558809 U | 4/2014 |
| CN | 203559861 U | 4/2014 |
| CN | 203559893 U | 4/2014 |
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |

(56) References Cited

FOREIGN PATENT DOCUMENTS

| | | |
|---|---|---|
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |

(56) References Cited

FOREIGN PATENT DOCUMENTS

| | | | |
|---|---|---|---|
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |

(56) References Cited

FOREIGN PATENT DOCUMENTS

| | | |
|---|---|---|
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 1004854 | 8/1991 |
| DE | 4241614 | 6/1994 |
| DE | 102012018825 | 3/2014 |
| DE | 102013111655 | 12/2014 |
| DE | 102015103872 | 10/2015 |
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | PCT/CN2012/074945 | 11/2013 |
| WO | 2013185399 | 12/2013 |
| WO | 2015158020 | 10/2015 |
| WO | 2016014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2017123656 A | 7/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021041783 | 3/2021 |

OTHER PUBLICATIONS

Filipović, Ivan, Preliminary Selection of Basic Parameters of Different Torsional Vibration Dampers Intended for use in Medium-Speed Diesel Engines, Transactions of Famena XXXVI-3 (2012).

Marine Turbine Technologies, 1 MW Power Generation Package, http://marineturbine.com/power-generation, 2017.

Business Week: Fiber-optic cables help fracking, cablinginstall.com. Jul. 12, 2013. https://www.cablinginstall.com/cable/article/16474208/businessweek-fiberoptic-cables-help-fracking.

Fracking companies switch to electric motors to power pumps, iadd-intl.org. Jun. 27, 2019. https://www.iadd-intl.org/articles/fracking-companies-switch-to-electric-motors-to-power-pumps/.

The Leader in Frac Fueling, suncoastresources.com. Jun. 29, 2015. https://web.archive.org/web/20150629220609/https://www.suncoastresources.com/oilfield/fueling-services/.

Mobile Fuel Delivery, atlasoil.com. Mar. 6, 2019. https://www.atlasoil.com/nationwide-fueling/onsite-and-mobile-fueling.

Frac Tank Hose (FRAC), 4starhose.com. Accessed: Nov. 10, 2019. http://www.4starhose.com/product/frac_tank_hose_frac.aspx.

Plos One, Dynamic Behavior of Reciprocating Plunger Pump Discharge Valve Based on Fluid Structure Interaction and Experimental Analysis. Oct. 21, 2015.

FMC Technologies, Operation and Maintenance Manual, L06 Through L16 Triplex Pumps Doc No. OMM50000903 Rev: E p. 1 of 66. Aug. 27, 2009.

Gardner Denver Hydraulic Fracturing Pumps GD 3000 https://www.gardnerdenver.com/en-us/pumps/triplex-fracking-pump-gd-3000.

Lekontsev, Yu M., et al. "Two-side sealer operation." Journal of Mining Science 49.5 (2013): 757-762.

Tom Hausfeld, GE Power & Water, and Eldon Schelske, Evolution Well Services, TM2500+ Power for Hydraulic Fracturing.

FTS International's Dual Fuel Hydraulic Fracturing Equipment Increases Operational Efficiencies, Provides Cost Benefits, Jan. 3, 2018.

CNG Delivery, Fracturing with natural gas, dual-fuel drilling with CNG, Aug. 22, 2019.

PbNG, Natural Gas Fuel for Drilling and Hydraulic Fracturing, Diesel Displacement / Dual Fuel & Bi-Fuel, May 2014.

Integrated Flow, Skid-mounted Modular Process Systems, Jul. 15, 2017, https://ifsolutions.com/why-modular/.

(56) References Cited

OTHER PUBLICATIONS

Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Sarety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jurgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities purenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 2012.
Blago Minovski, Coupled Simulations of Cooling and Engine Systems for Unsteady Analysis of the Benefits of Thermal Engine Encapsulation, Department of Applied Mechanics, Chalmers University of Technology G⁻oteborg, Sweden 2015.
J. Porteiro et al., Feasibility of a new domestic CHP trigeneration with heat pump: II. Availability analysis. Design and development, Applied Thermal Engineering 24 (2004) 1421-1429.
ISM, What is Cracking Pressure, 2019.
Swagelok, The right valve for controlling flow direction? Check, 2016.
Technology.org, Check valves how do they work and what are the main type, 2018.
AFGlobal Corporation, Durastim Hydraulic Fracturing Pump, A Revolutionary Design for Continuous Duty Hydraulic Fracturing, 2018.
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Dowell B908 "Turbo-Jet" Operator's Manual.
Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gasfield operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PIkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sep. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.com/news/oil-gas/a/124883/Turbine_Technology_Powers_Green_Field_MultiFuel_Frack_Pump.
"Turbine Frac Units," WMD Squared (2012), https://wmdsquared.com/work/gfes-turbine-frac-units/.
Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.
"Honghua developing new-generation shale-drilling rig, plans testing of frac pump"; Katherine Scott; Drilling Contractor; May 23,

(56) References Cited

OTHER PUBLICATIONS

2013; accessed at https://www.drillingcontractor.org/honghua-developing-new-generation-shale-drilling-rig-plans-testing-of-frac-pump-23278.
Europump and Hydrualic Institute, Variable Speed Pumping: A Guide to Successful Applications, Elsevier Ltd, 2004.
Capstone Turbine Corporation, Capstone Receives Three Megawatt Order from Large Independent Oil & Gas Company in Eagle Ford Shale Play, Dec. 7, 2010.
Wikipedia, Westinghouse Combustion Turbine Systems Division, https://en.wikipedia.org/wiki/Westinghouse_Combustion_Turbine_Systems_Division, circa 1960.
Wikipedia,Union Pacific GTELs, https://en.wikipedia.org/wiki/Union_Pacific_GTELs, circa 1950.
HCI JET Frac, Screenshots from YouTube, Dec. 11, 2010. https://www.youtube.com/watch?v=6HjXkdbFaFQ.
AFD Petroleum Ltd., Automated Hot Zone, Frac Refueling System, Dec. 2018.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Walzel, Brian, Hart Energy, Oil, Gas Industry Discovers Innovative Solutions to Environmental Concerns, Dec. 10, 2018.
Frac Shack, Bi-Fuel FracFueller brochure, 2011.
Pettigrew, Dana, et al., High Pressure Multi-Stage Centrifugal Pump for 10,000 psi Frac Pump—HPHPS FRAC Pump, Copyright 2013, Society of Petroleum Engineers, SPE 166191.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-injection Stations; American Petroleum Institute; API-63 144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (Solar Division International Harvester Co.), Modem Industrial Gas Turbines for the Oil Field; American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services; SPE-2706 (1969).
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
Kas'yanov et al., Application of gas-turbine engines in pumping units complexes of hydraulic fracturing of oil and gas reservoirs; Exposition Oil & Gas; (Oct. 2012) (published in Russian).
American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.
Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-genera.pdf.
The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
De Gevigney et al., "Analysis of no-load dependent power losses in a planetary gear train by using thermal network method", International Gear Conference 2014: Aug. 26-28, 2014, Lyon, pp. 615-624.
Special-Purpose Couplings for Petroleum, Chemical, and Gas Industry Services, API Standard 671 (4th Edition) (2010.
The Application of Flexible Couplings for Turbomachinery, Jon R. Mancuso et al., Proceedings of the Eighteenthturbomachinery Symposium (1989).
Pump Control With Variable Frequency Drives, Kevin Tory, Pumps & Systems: Advances in Motors and Drives, Reprint from Jun. 2008.
Fracture Design and Stimulation, Mike Eberhard, P.E., Wellconstruction & Operations Technical Workshop Insupport of the EPA Hydraulic Fracturing Study, Mar. 10-11, 2011.
General Purpose vs. Special Purpose Couplings, Jon Mancuso, Proceedings of the Twenty-Third Turbomachinerysymposium (1994).
Overview of Industry Guidance/Best Practices on Hydraulic Fracturing (HF), American Petroleum Institute, © 2012.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, © Aug. 2020.
About API, American Petroleum Institute, https://www.api.org /about, accessed Dec. 30, 2021.
About API, American Petroleum Institute, WaybackMachine Capture, https://web.archive.org/web/20110422104346 /http://api.org/aboutapi/, captured Apr. 22, 2011.
Publications, American Petroleum Institute, WaybackMachine Capture, https://web.archive.org/web/20110427043936 /http://www.api.org:80/Publications/, captured Apr. 27, 2011.
Procedures for Standards Development, American Petroleum Institute, Third Edition (2006).
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.
2011 Publications and Services, American Petroleum Institute (2011).
Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.
IHS Markit Standards Store, https://global.ihs.com/doc_ detail.cfm?document_name=API%20STD%20674&item_s_key=00010672#doc-detail-history-anchor, accessed Dec. 30, 2021; and https://global.

(56) References Cited

OTHER PUBLICATIONS ihs.com/doc_detail.cfm?&input_doc_number=671 &input_doc_title=&document_name=API%20STD%20671&item_s_key=00010669&item_key_date=890331&origin=DSSC, accessed Dec. 30, 2021.

* cited by examiner

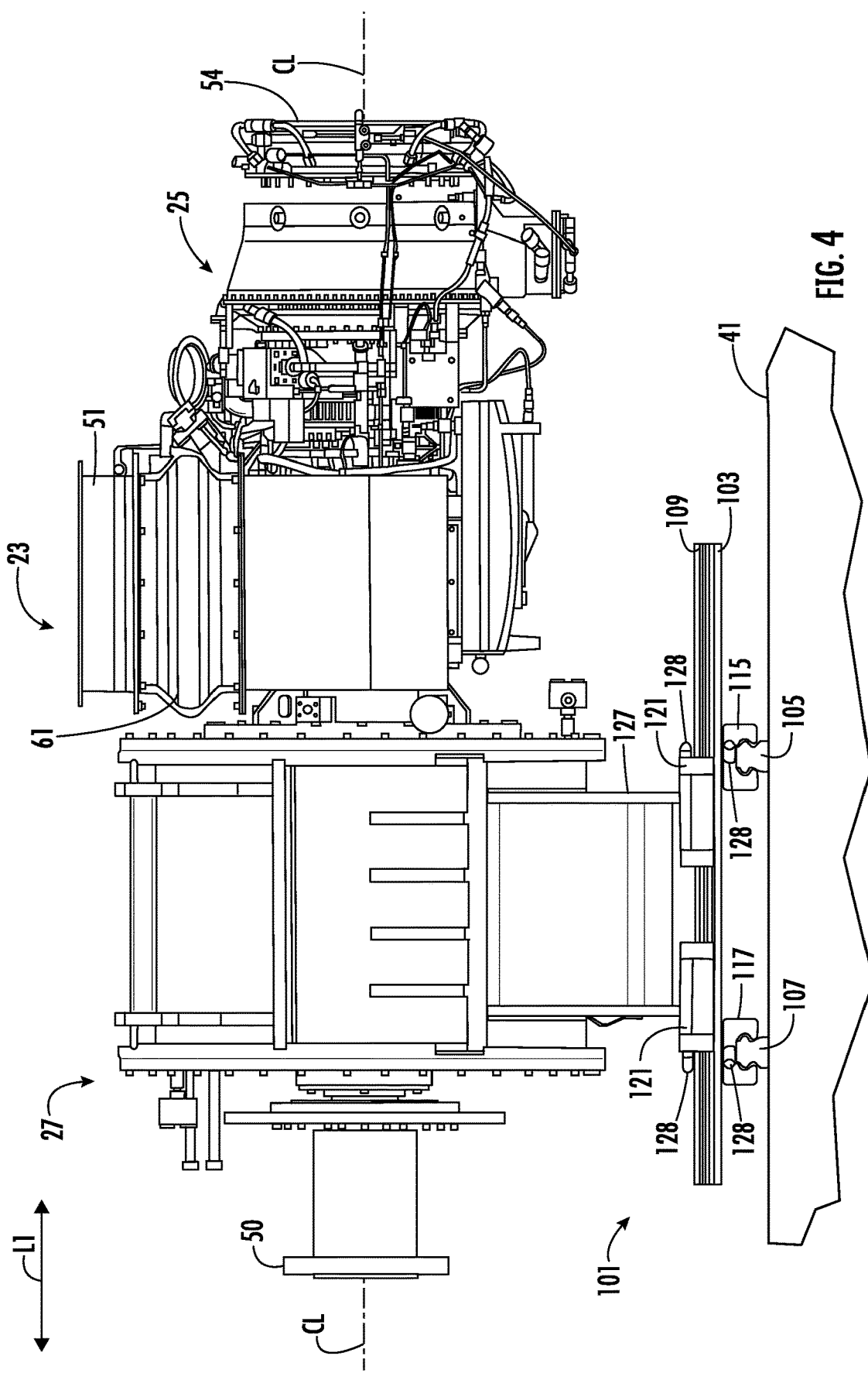

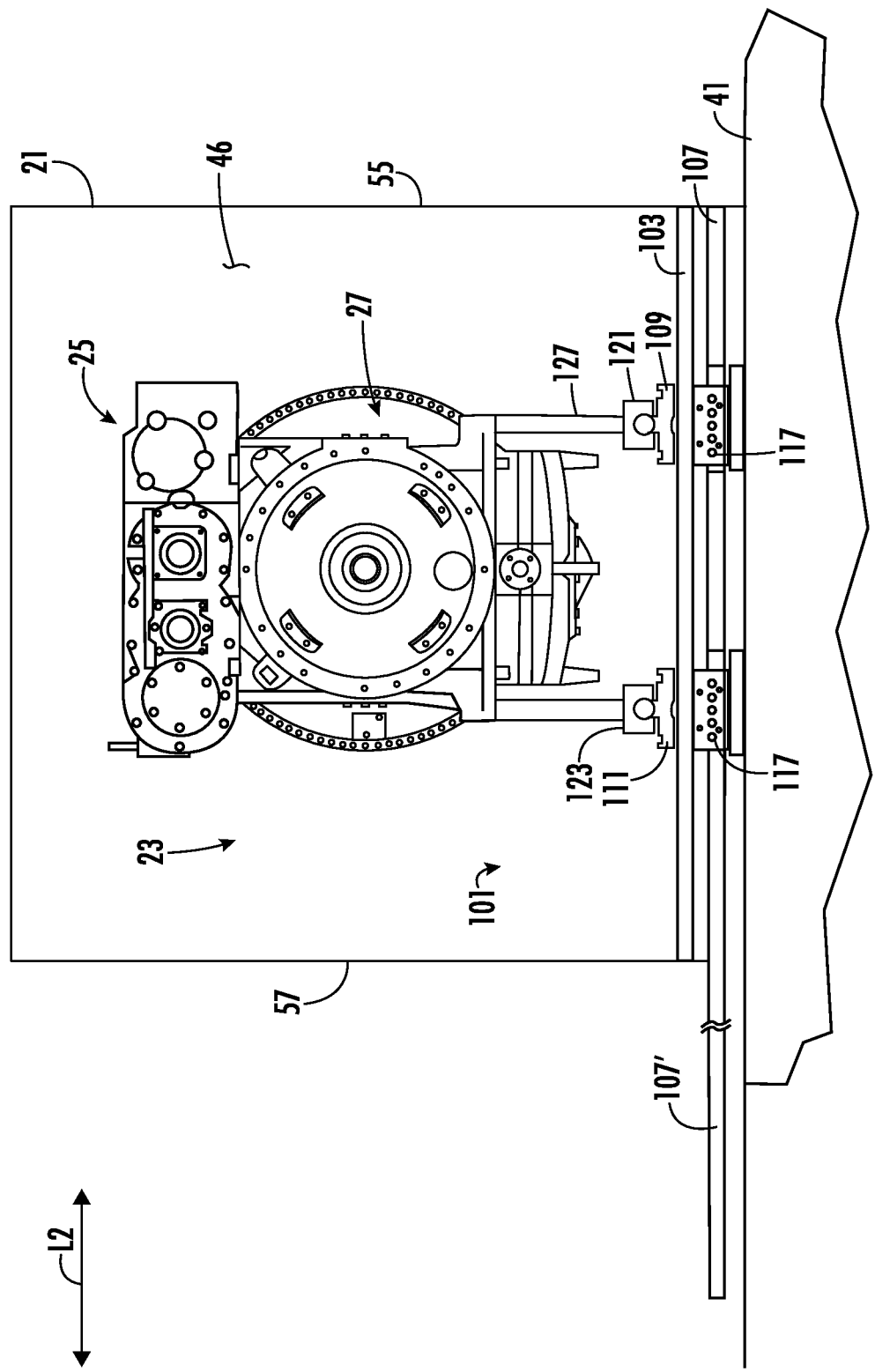

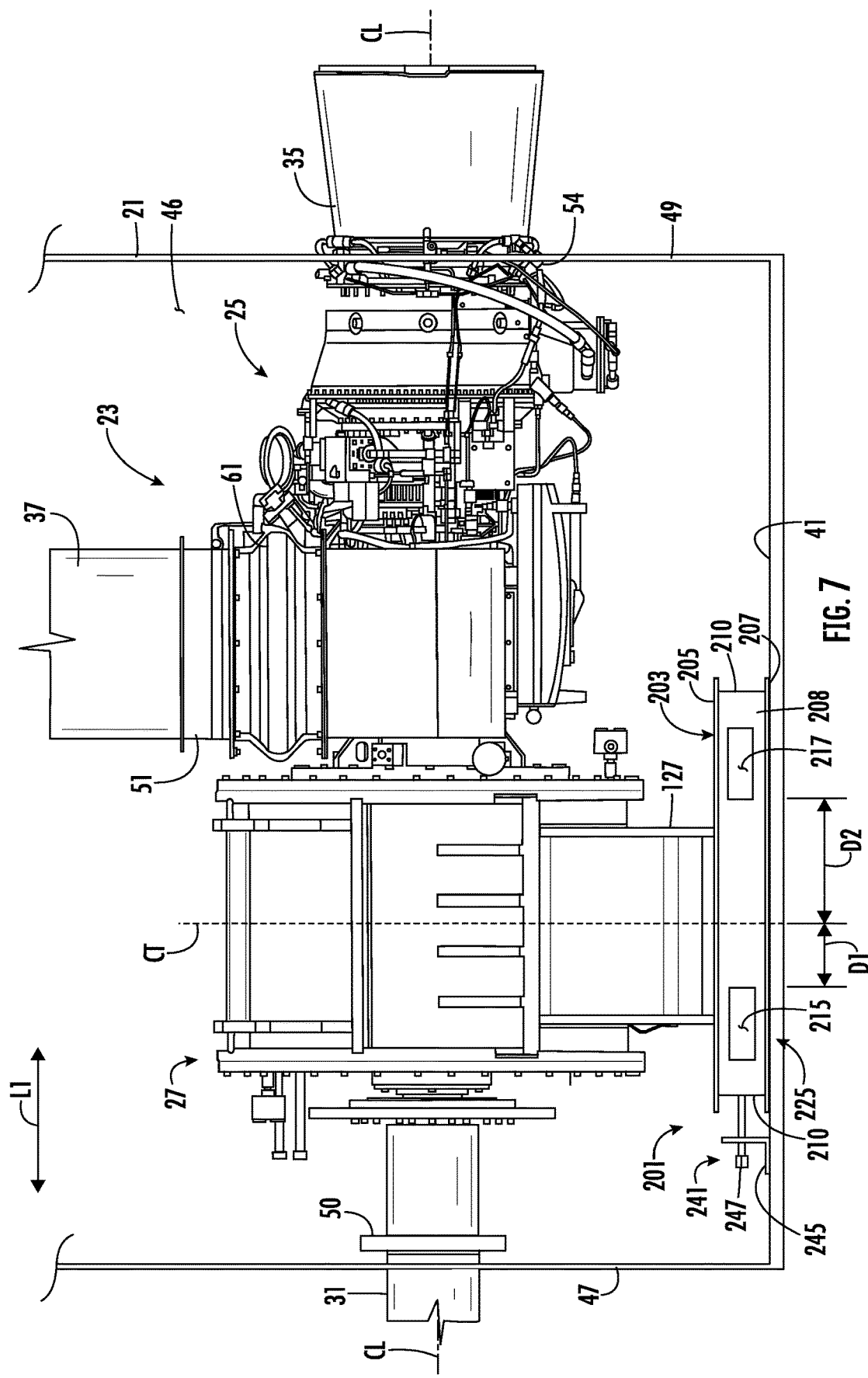

DIRECT DRIVE UNIT REMOVAL SYSTEM AND ASSOCIATED METHODS

CROSS REFERENCE TO RELATED APPLICATIONS

This application is a continuation of U.S. Non-Provisional application Ser. No. 17/671,734, filed Feb. 15, 2022, titled "DIRECT DRIVE UNIT REMOVAL SYSTEM AND ASSOCIATED METHODS," which is a continuation of U.S. Non-Provisional application Ser. No. 17/204,338, filed Mar. 17, 2021, titled "DIRECT DRIVE UNIT REMOVAL SYSTEM AND ASSOCIATED METHODS," which is a continuation of U.S. Non-Provisional application Ser. No. 17/154,601, filed Jan. 21, 2021, titled "DIRECT DRIVE UNIT REMOVAL SYSTEM AND ASSOCIATED METHODS," now U.S. Pat. No. 10,982,596, issued Apr. 20, 2021, which is a divisional of U.S. Non-Provisional application Ser. No. 17/122,433, filed Dec. 15, 2020, titled "DIRECT DRIVE UNIT REMOVAL SYSTEM AND ASSOCIATED METHODS," now U.S. Pat. No. 10,961,912, issued Mar. 30, 2021, which is a divisional of U.S. Non-Provisional application Ser. No. 15/929,924, filed May 29, 2020, titled "DIRECT DRIVE UNIT REMOVAL SYSTEM AND ASSOCIATED METHODS," now U.S. Pat. No. 10,895,202, issued Jan. 19, 2021, which claims the benefit of and priority to U.S. Provisional Application No. 62/899,975,filed Sep. 13, 2019, titled "TURBINE REMOVAL SYSTEM," the entire disclosures of which are incorporated herein by reference.

BACKGROUND OF THE DISCLOSURE

This disclosure relates to embodiments of systems and methods for the removal and/or positioning of a direct drive unit housed in an enclosure, such as a direct drive turbine (DDT) when connected to a gearbox for driving a driveshaft, which, in turn, may be connected to a pump such as for use in a hydraulic fracturing system.

Traditional fracturing pumping fleets have had fuel supplied from a single fuel source. In such units, when a unit runs low on fuel (for example diesel), that unit is shutdown while another stand by unit is brought in, refueled, and then put into service. Some inefficiencies included in this process are that the unit once low on primary fuel must be stopped, refueled while another unit is simultaneously being introduced into its place to make up for the loss of the pumping power that the unit provides. This may affect the pumping performance during a section as well as requiring human intervention to perform the refueling, lining up suction and discharge valves. This may require multiple personnel to relay back the information so the process is performed in the correct series of steps. Using a single fuel source also limits the ability for the fracturing fleet to make it continuously through a section when low on fuel which results in delays in pumping completion.

In addition, in cases where the unit needs to be taken offline for maintenance or replacement, significant disassembly is required to remove the unit from its enclosure and to install a replacement unit, potentially resulting in excessive downtime. In some cases, the entire trailer and enclosure need to be removed from the site so a new, fully equipped trailer may be moved into place.

Accordingly, it may be seen that a need exists for more efficient ways of accessing the drive units for maintenance purposes and/or replacement with minimum disruption to the system operations and the surrounding equipment. The present disclosure addresses these and other related and unrelated problems in the art.

SUMMARY OF THE DISCLOSURE

According to one embodiment of the disclosure, a method of removing a direct drive unit (DDU) housed in an enclosure. The DDU includes a gearbox and a turbine engine connected to the gearbox for driving a driveshaft connected to a pump for use in high-pressure, high-power hydraulic fracturing operations. The method may include accessing the enclosure. The enclosure contains air inlet ducting connected to the turbine engine and air exhaust ducting connected to the turbine engine. The method may further include disconnecting the turbine engine from the air inlet ducting, disconnecting the turbine engine from at least one fuel line, disconnecting the gearbox from the driveshaft, disconnecting the turbine engine from at least one exhaust flange connected to the air exhaust ducting, and operating a DDU positioner assembly to position the DDU for withdrawal from the enclosure, and removing the DDU from the enclosure.

According to another embodiment of the disclosure, a direct drive unit (DDU) positioner assembly is disclosed for positioning a DDU housed in an enclosure for removal from the enclosure. The DDU includes a gearbox and a turbine engine connected to the gearbox for driving a driveshaft connected to a pump for use in high-pressure, high-power hydraulic fracturing operations. The DDU positioner assembly may include a plurality of longitudinal rails extending in a longitudinal direction along the central axis of the DDU and a plurality of lateral rails extending in a lateral direction transverse to the longitudinal direction. The DDU positioner assembly may further include a platform slidably connected to the plurality of lateral rails. The plurality of longitudinal rails may be mounted on the platform and the DDU may be slidably connected to the longitudinal rails. The DDU may be movable in the longitudinal direction along the longitudinal rails and the platform may be movable in the lateral direction along the lateral rails.

According to yet another embodiment of the disclosure, a direct drive unit (DDU) positioner assembly is disclosed for positioning a DDU housed in an enclosure for removal from the enclosure. The DDU includes a gearbox and a turbine engine connected to the gearbox for driving a driveshaft connected to a pump for use in high-pressure, high-power, hydraulic fracturing operations. The DDU positioner assembly may include a platform connected to a support of the gearbox and mounted on an enclosure base of the enclosure. The enclosure base may have a plurality of lubrication grooves for facilitating sliding movement of the platform relative to the enclosure base. The DDU positioner assembly may include a lubricator to convey lubricant to the lubrication grooves. The platform may be fixedly attached to the enclosure base by one or more fasteners during operation of the DDU and in slidable engagement with the enclosure base upon removal of the one or more fasteners.

Those skilled in the art will appreciate the benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

FIG. 4 is a side elevation view of the DDU mounted on a DDU positioner assembly according to a first embodiment of the disclosure.

FIG. 5 is an end elevation view of the DDU of FIG. 4 according to a first embodiment of the disclosure.

FIG. 7 is a side elevation view of the DDU mounted on a DDU positioner assembly according to a second embodiment of the disclosure.

Corresponding parts are designated by corresponding reference numbers throughout the drawings.

DETAILED DESCRIPTION

Generally, this disclosure is directed to a direct drive unit (DDU) positioner assembly, positioning system, removal system, and/or associated mechanisms that will allow a DDU including a gearbox and a turbine engine connected to the gearbox to be detached from surrounding equipment and removed through the side of an enclosure housing the direct drive unit. The system will allow for inspections, maintenance, or even a complete exchange of the direct drive unit with another if necessary.

Figure 1A:
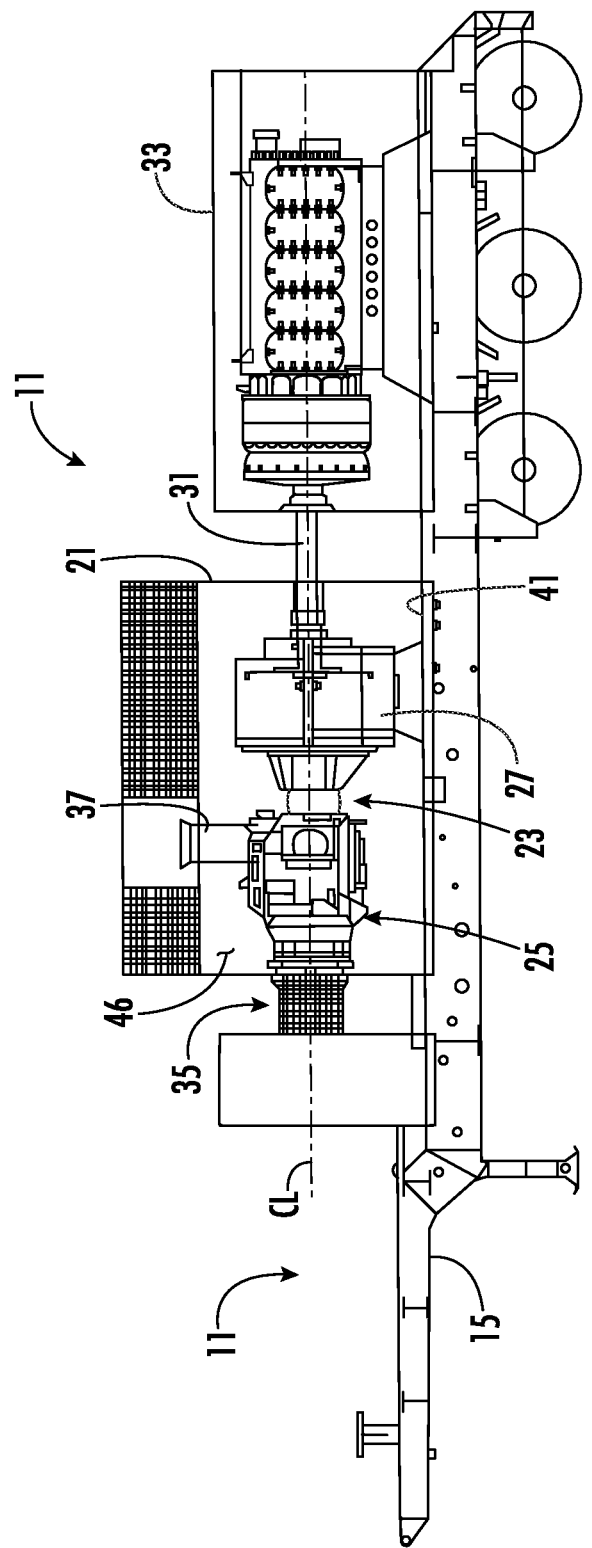
FIG. 1A is a schematic diagram of a pumping unit according to an embodiment of the disclosure.
Figure 1B:
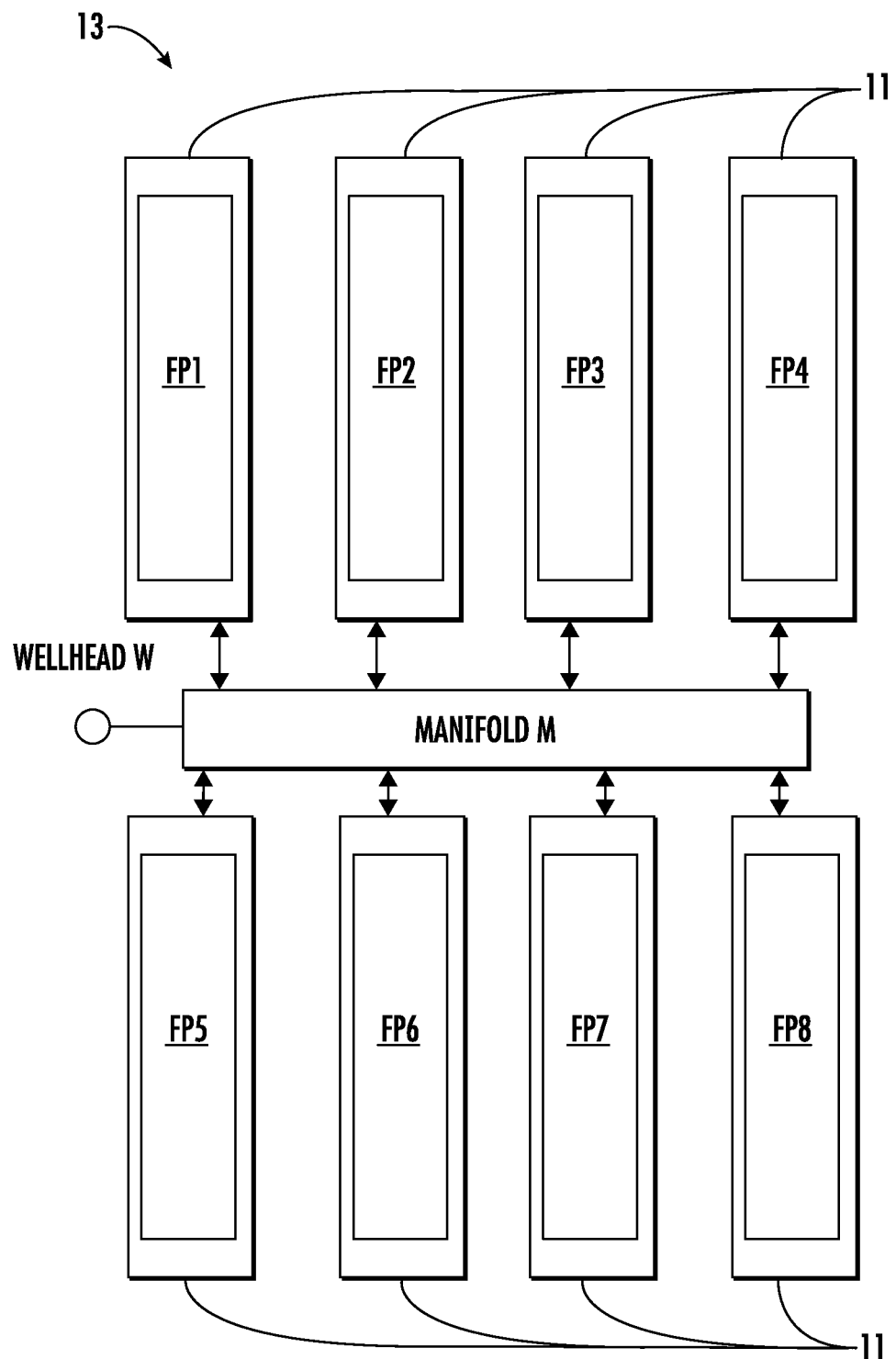
FIG. 1B is a schematic diagram of a layout of a fluid pumping system according to an embodiment of the disclosure.

FIG. 1A illustrates a schematic view of a pumping unit 11 for use in a high-pressure, high power, fluid pumping system 13 (FIG. 1B) for use in hydraulic fracturing operations according to one embodiment of the disclosure. FIG. 1B shows a typical pad layout of the pumping units 11 (indicated as FP1, FP2, FP3, FP4, FP5, FP6, FP7, FP8) with the pumping units all operatively connected to a manifold M that is operatively connected to a wellhead W. By way of an example, the system 13 is a hydraulic fracturing application that may be sized to achieve a maximum rated horsepower of 24,000 HP for the pumping system 13, including a quantity of eight (8) 3000horsepower (HP) pumping units 11 that may be used in one embodiment of the disclosure. It will be understood that the fluid pumping system 13 may include associated service equipment such as hoses, connections, and assemblies, among other devices and tools. As shown in FIG. 1, each of the pumping units 11 are mounted on a trailer 15 for transport and positioning at the jobsite. Each pumping unit 11 includes an enclosure 21 that houses a direct drive unit (DDU) 23 including a gas turbine engine 25 operatively connected to a gearbox 27. The pumping unit 11 has a driveshaft 31 operatively connected to the gearbox 27. The pumping unit 11 includes a high-pressure, high-power, reciprocating positive displacement pump 33 that is operatively connected to the DDU 23 via the driveshaft 31. In one embodiment, the pumping unit 11 is mounted on the trailer 15 adjacent the DDU 23. The trailer 15 includes other associated components such as a turbine exhaust duct 35 operatively connected to the gas turbine engine 25, air intake duct 37 operatively connected to the gas turbine, and other associated equipment hoses, connections, etc. to facilitate operation of the fluid pumping unit 11.

In the illustrated embodiment, the gas turbine engine 25 is a Vericor Model TF50F bi-fuel turbine; however, the direct drive unit 23 may include other gas turbines or suitable drive units, systems, and/or mechanisms suitable for use as a hydraulic fracturing pump drive without departing from the disclosure. The gas turbine engine 25 is cantilever mounted to the gearbox 27 with the gearbox supported by the floor 41 of the enclosure 21. The gearbox 27 may be a reduction helical gearbox that has a constant running power rating of 5500 SHP and intermittent power output of 5850 SHP, or other suitable gearbox. It should also be noted that, while the disclosure primarily describes the systems and mechanisms for use with direct drive units 23 to operate fracturing pumping units 33, the disclosed systems and mechanisms may also be directed to other equipment within the well stimulation industry such as, for example, blenders, cementing units, power generators and related equipment, without departing from the scope of the disclosure.

Figure 2:
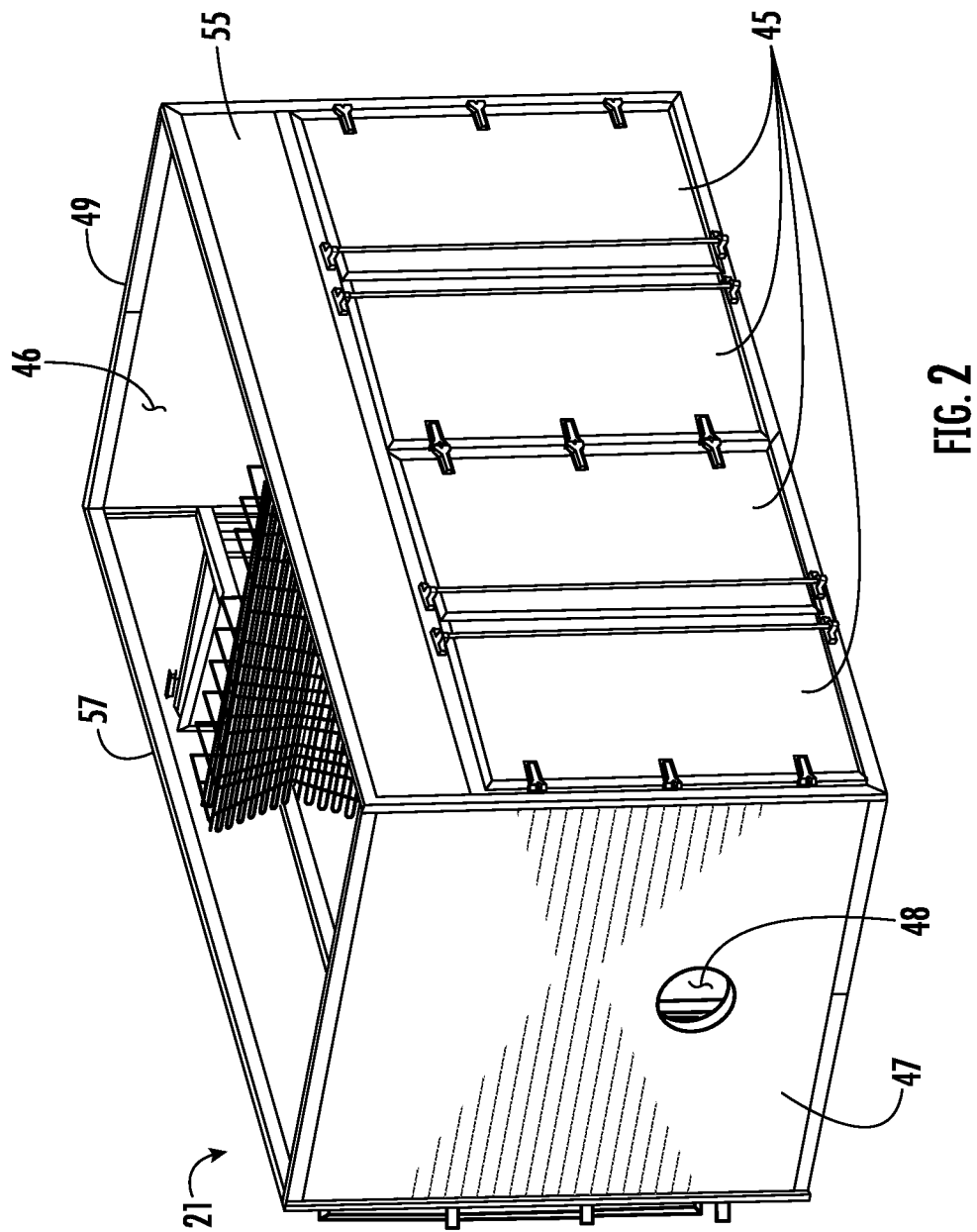
FIG. 2 is a perspective view of an enclosure for housing a direct drive unit (DDU) according to an embodiment of the disclosure.

FIG. 2 illustrates the enclosure 21 that houses the direct drive unit 23 in an interior space 46 of the enclosure. In one embodiment, the enclosure has access doors 45 for removal of the DDU 23 from the enclosure and/or other components within the enclosure. The enclosure 21 provides sound attenuation of the DDU 23 during operation.

Figure 3:
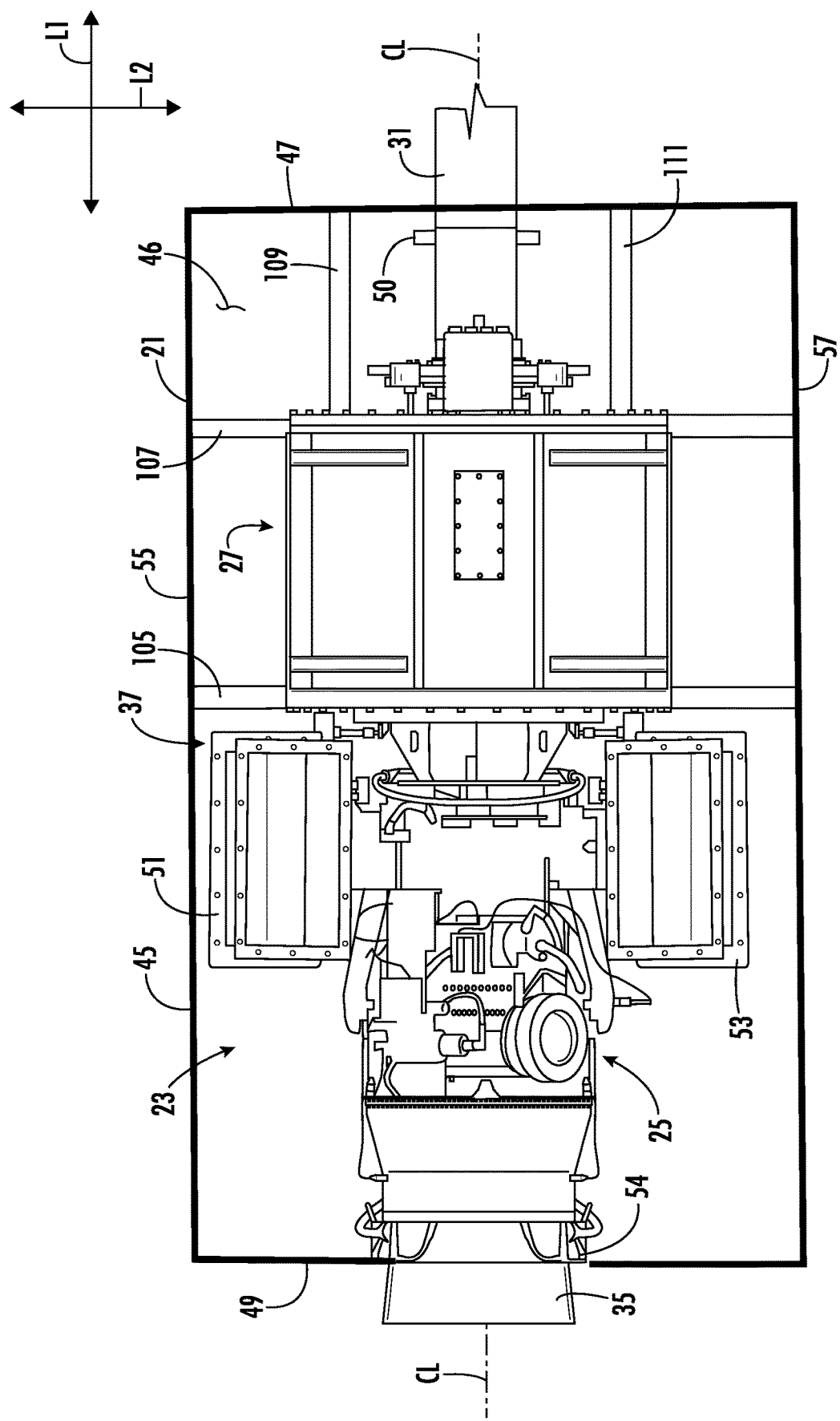
FIG. 3 is a top plan view of the enclosure housing the DDU according to an embodiment of the disclosure.

As shown in FIG. 3, the direct drive unit 23 and the enclosure 21 has a longitudinal axis L1 and a lateral axis L2 transverse to the longitudinal axis. FIG. 3 illustrates a top view of the enclosure 21 with the DDU 23 shown attached to the driveshaft 31 that extends through an opening 48 in a first longitudinal end 47 of the enclosure. An air exhaust assembly 35 extends through a second longitudinal end 49 of the enclosure. The DDU 23 has a central axis CL extending in the longitudinal direction L1 that extends through the centerline of the unit and is aligned with the centerline of the driveshaft 31. The gearbox 27 includes an outlet flange 50 that is connected to the driveshaft 31. The gas turbine engine 25 has two air inlet ports 51, 53 on a respective lateral side of the central axis CL and an exhaust duct flange 54 that connects the gas turbine engine to the air exhaust assembly 35 at the longitudinal end 49 of the enclosure 21. In one embodiment, the access doors 45 are mounted on a first lateral side 55 of the enclosure 21, but the enclosure may have additional access doors on a second lateral side 57 of the enclosure, or the access doors may be positioned only on the second lateral side without departing from the scope of this disclosure. The gas turbine engine 25 may include polymer expansion joints 61, 63 connected to air inlet ports 51, 53, to facilitate the removal of the gas turbine engine from the enclosure 21. The gas turbine engine 25 may include various fuel lines, communication lines, hydraulic and pneumatic connections, and other connections or accessories needed for operation of the gas turbine engine without departing from the disclosure. Such connections may utilize quick disconnect fittings and check valves to facilitate disconnection of the gas turbine engine 25 during removal of the DDU 23 from the enclosure 21. Further, such connections such as fuel lines and hydraulic lines may run to a single bulkhead (not shown) within or near the enclosure to allow for quick disconnection by locating these connections in a common location.

FIG. 4 is a side elevation view of the DDU 23 as viewed from the lateral side 55 of the enclosure 21, with the DDU being mounted on a DDU positioner assembly or DDU positioning system 101 (FIGS. 4-6C) for positioning the DDU for withdrawal or removal from the enclosure through the access doors 45. In one embodiment, the DDU positioner assembly 101 comprises a platform 103 slidably mounted to overlie two lateral rails 105, 107 mounted to overlie the floor 41 of the enclosure 21 and extending laterally across the enclosure generally between the lateral sides 55, 57. The DDU positioner assembly 101 comprises two longitudinal rails 109, 111 mounted to overlie the platform 103 and extending in the longitudinal direction L1. The DDU 23 is slidably mounted on the longitudinal rails 109, 111 for positioning the DDU in the longitudinal direction L1. In one embodiment, the DDU positioner assembly 101 includes lateral guide rollers 115, 117 mounted on a respective lateral rail 105, 107, and longitudinal guide rollers 121, 123 mounted on a respective longitudinal rail 109, 111. The platform 103 is connected to the lateral guide rollers 115, 117 to allow slidable movement and positioning of the DDU 23 mounted on the platform in the lateral direction L2 via the lateral rails 105, 107. The longitudinal guide rollers 121, 123 are connected to a mounting base 127 of the gearbox 27 to allow slidable movement and positioning of the DDU 23 in the longitudinal direction L1 via the longitudinal rails 109, 111. In one embodiment, the DDU positioner assembly 101 includes four lateral guide rollers 115, 117 and four longitudinal guide rollers 121, 123, but more or less than eight guide rollers may be provided without departing from the scope of the disclosure. Further, more or less than two longitudinal rails 109, 111, and more or less than two lateral rails 105, 107 may be provided without departing from the scope of the disclosure. In one embodiment, the guide rollers 115, 117, 121, 123 may be a caged ball type linear motion (LM) Guide, model number SPS20LR available from THK America Inc., or any similar make or model number without departing from the scope of the disclosure. The DDU positioner assembly 101 may be equipped with locking mechanisms 128 mounted on a respective guide roller 115, 117, 121, 123. The locking mechanisms 128 may be spring loaded and will default to the locked position to allow the DDU 23 to be secured in the operating position. The locking mechanism 128 may be otherwise located on the positioning system 101 without departing from the disclosure.

Exemplary loading calculations for sizing the guide rails 105, 107, 109, 111 are shown below and are based on the Vericor TF50F turbine parameters as follows: approximate turbine weight, 1475 lbs.; approximate fuel system weight, 85 lbs.; approximate gearbox weight, 4000 lbs.; for a total approximate weight of 5559 lbs. Various other parameters may be applicable based on the make, model, and size of the gas turbine engine 25.

Because of the arrangement the direct drive unit 23 including the gas turbine engine 25 cantilever mounted onto the gearbox 27 and extending in the longitudinal direction L1 from the gearbox, there is added load put onto the rear lateral guide rollers 115 and the rear longitudinal guide rollers 121, 123 (the guide rollers mounted closest to the gas turbine engine). Accordingly, an increased load rating may be applied to the rear guide rollers 115, 121, 123 if required. The calculation of the cantilever load and the reaction forces may be calculated with the formulas shown below, which may also be used for further design and implementation of the disclosed removal mechanisms.

Maximum Reaction at the fixed end may be expressed as: $R_A = qL$.

where: $R_A$=reaction force in A (N, lb), q=uniform distributed load (N/m, N/mm, lb/in), and L=length of cantilever beam (m, mm, in).

Maximum Moment at the fixed end may be expressed as $M_A = -qL^2/2$

Maximum Deflection at the end may be expressed as $\delta_B = qL^4/(8EI)$.

where: $\delta_B$=maximum deflection in B (m, mm, in).

In one embodiment, the longitudinal guide rollers 121, 123 connected to the support structure 127 of the gearbox 27 are positioned between each pair of the lateral guide rollers 115, 117 to ensure equal weight distribution over the platform 103 and to avoid cantilever loading the platform. Different configurations of platforms, sliders, rails and mounts are contemplated and considered within the scope of the disclosure. The configurations of the DDU positioner assembly 101 may vary to suit a particular DDU 23 with various alternative combinations of makes, model, and sizes of the gas turbine engine 25 and the gearbox 27.

In one embodiment, the guide rails 105, 107, 109, 111 are made from a steel composition that has been mill finished and shot blasted to protect the rail from the high heat environment within the turbine enclosure 21 and ensure strength retention under the exposed temperatures. In one embodiment, the platform 103 is constructed out of a composite material; however, other materials are contemplated and considered within the scope of the disclosure, such as but not limited to, steel or stainless steel. The guide rails 105, 107, 109, 111, platform 103, and/or other components of the DDU positioner assembly 101 may be made of various other suitable materials without departing from the scope of the disclosure.

Figure 6A:
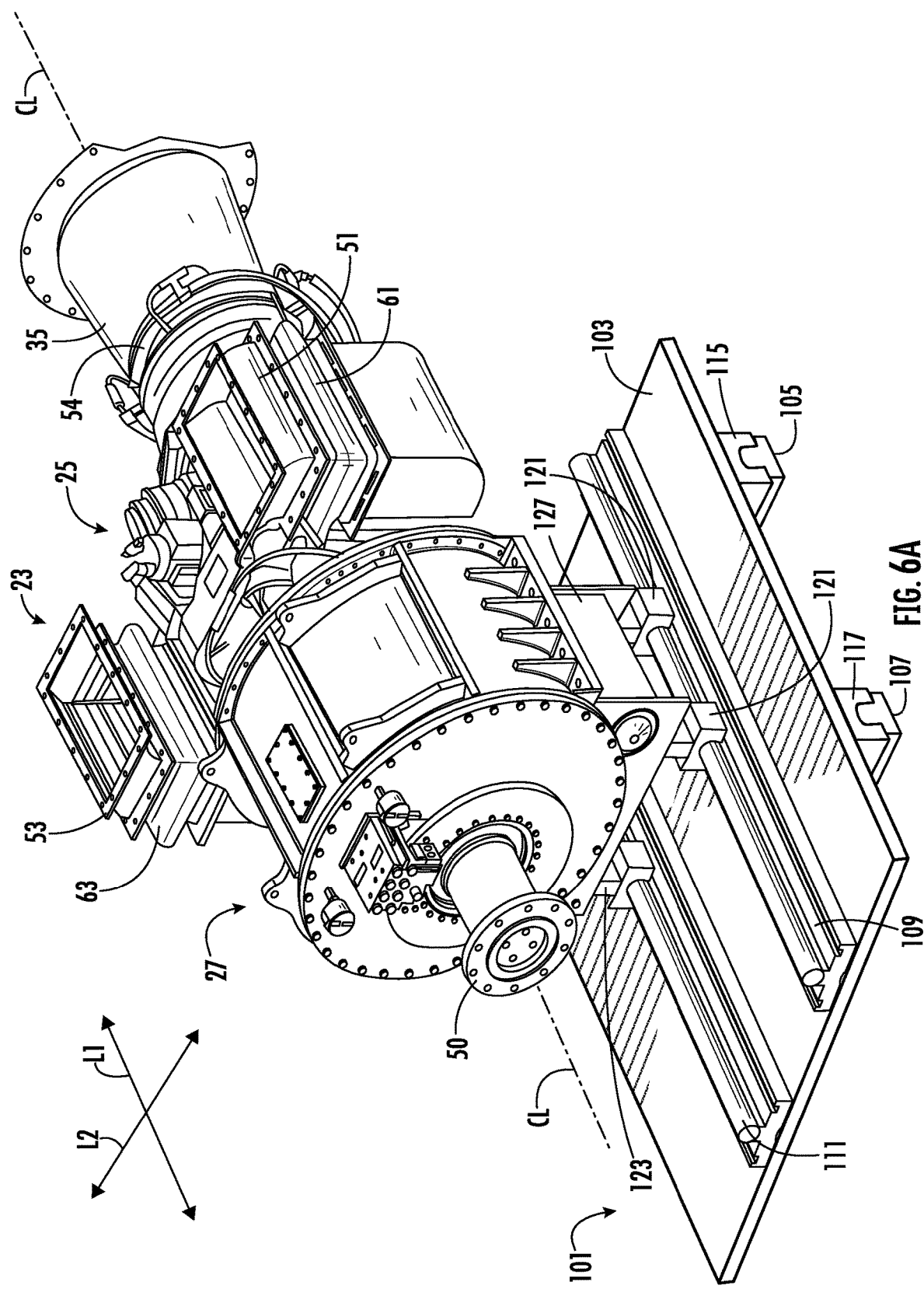
FIG. 6A is a perspective view of the DDU of FIG. 4 in a first position according to a first embodiment of the disclosure.
Figure 6B:
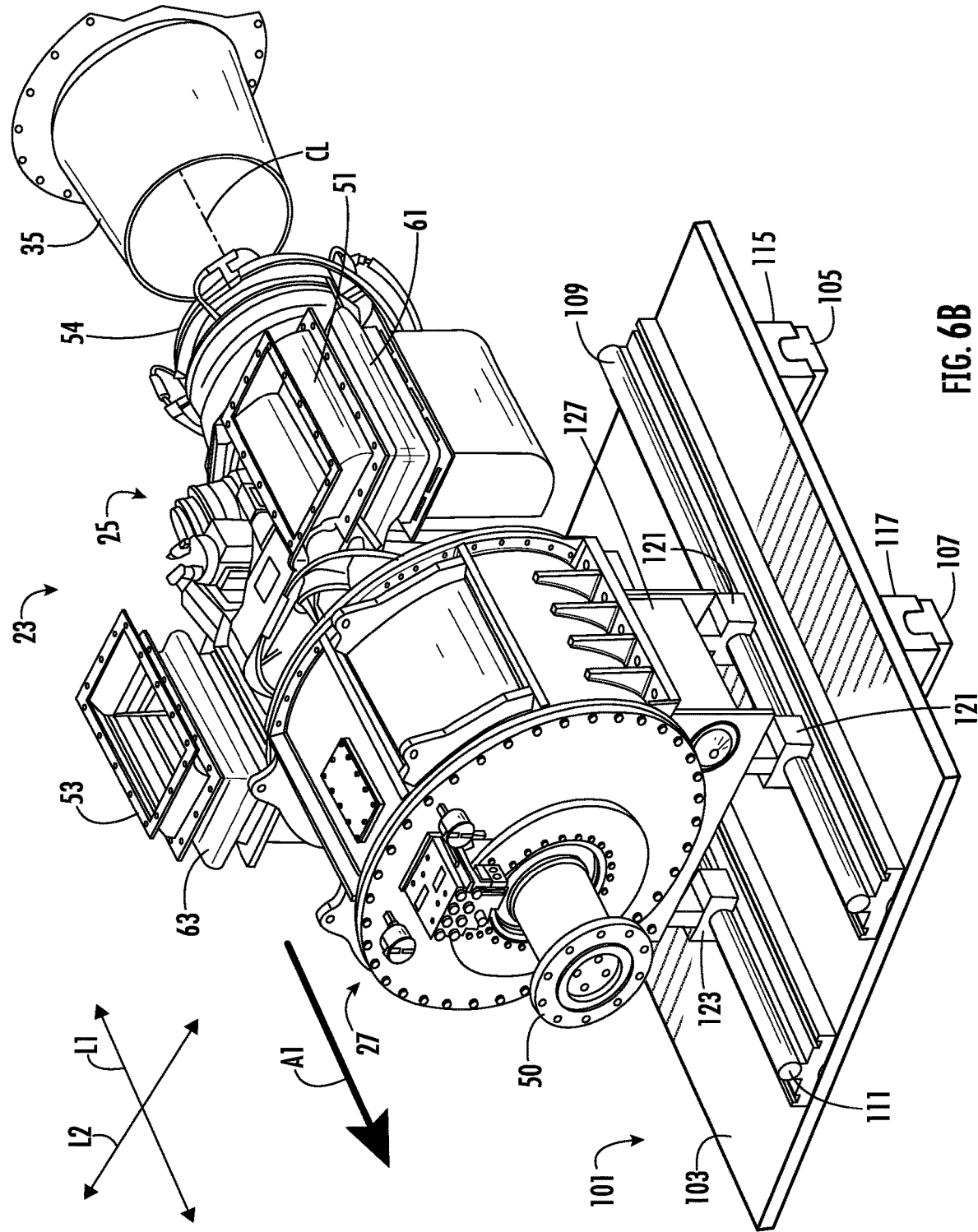
FIG. 6B is a perspective view of the DDU of FIG. 6A moved to a second position according to a first embodiment of the disclosure.
Figure 6C:
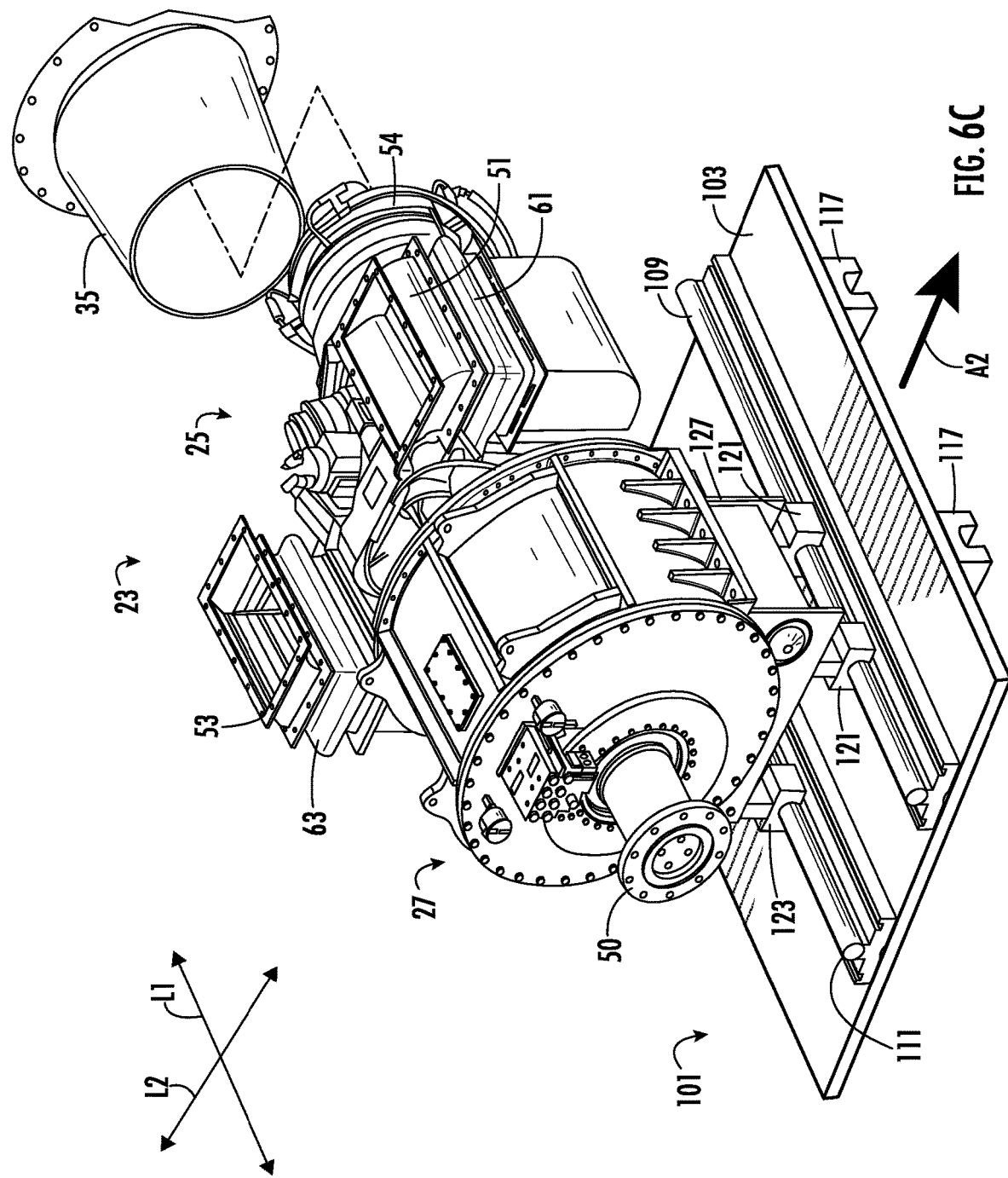
FIG. 6C is a perspective view of the DDU of FIG. 6B moved to a third position according to a first embodiment of the disclosure.

FIGS. 6A-6B illustrate an exemplary method of removing the direct drive unit 23 from the enclosure 21 utilizing the DDU positioner assembly 101. FIG. 6A shows the DDU 23 in a first/operating position for operation with the pump 33 of the pumping unit 11. The method includes accessing the enclosure 21 and disconnecting the gas turbine engine 25 from the air inlet ducting 37. The flanges 51, 53 may be disconnected from the air inlet ducting 37 and the expansion joints 61, 63 flexed to allow separation of the DDU 23 from the air inlet ducting. The gas turbine engine 25 may be disconnected from the air exhaust ducting 35 by disconnecting the exhaust duct flange 54 from the air exhaust ducting. Corresponding hoses, piping, wiring, and cabling including fuel lines, electrical lines, hydraulic lines, control lines or any other connection that is needed for operation of the gas turbine engine 25 may also be disconnected so that the gas turbine engine is free to move without damaging any of the operational connections needed for operation of the gas turbine engine. For example, the air bleed off valve ducting may be removed from the turbine engine 25 and secured at a location free of interference with movement of the turbine engine. Alternatively, some hoses, piping, wiring, etc. may include enough slack or flexibility so that the DDU 23 may be initially moved before complete disconnection of the connections from the gas turbine engine 25 are required for removal of the DDU from the enclosure 21. The gearbox 27 may be disconnected from the driveshaft 31 by disconnecting the outlet flange 50 from the driveshaft. In one embodiment, the driveshaft 31 may be a slip-fit driveshaft allowing the driveshaft to contract to facilitate disconnection from the DDU 23. In one embodiment, the driveshaft 31 may be a 390 Series, GWB Model 390.80 driveshaft available Dana Corporation, or other suitable driveshaft. The gearbox 27 may be disconnected from any other connections needed for operation of the DDU 23 to obtain freedom of movement of the gearbox without damaging any of the operating connections.

Once the gas turbine engine 25 is disconnected from the respective connections and the gearbox 27 is disconnected from the driveshaft 31, the DDU positioner assembly 101 is operated to position the direct drive unit 23 for withdrawal from the enclosure 21. As shown in FIG. 6B, the DDU 23 is positioned in a second position where the DDU is first moved in the longitudinal direction L1 in the direction of arrow Al by sliding the DDU along the longitudinal rails 109, 111. In one embodiment, prior to initial movement of the DDU 23 in the longitudinal direction L1, the longitudinal locks 128 associated with the longitudinal guide rollers 121, 123 must be released to allow the movement of the DDU in the longitudinal direction. After the movement of the DDU 23 in the longitudinal direction L1 to the second position, the longitudinal locks 128 may be reengaged to lock the longitudinal guide rollers 121, 123 and prevent further or additional unwanted movement of the DDU 23 along the longitudinal rails 109, 111, and the lateral locks 128 associated with the lateral guide rollers 115, 117 may be disengaged to allow lateral movement of the DDU 23. Next, the platform 103 may be moved to a third position by moving in the lateral direction L2 in the direction of arrow A2 (FIG. 6C) by sliding movement of the lateral guide rollers 115, 117 along the lateral guide rails 105, 107. The DDU 23 is mounted to the platform 103 and moves with the platform in the lateral direction L2 to the third position of FIG. 6C. As shown in FIGS. 3 and 5, the lateral guide rails 105, 107 may extend to the access doors 45 in either side 55, 57 of the enclosure 21. In some embodiments, lateral guide rail extensions 107' (FIG. 5) may be used to extend outside of the enclosure 21 to allow the platform 103 and DDU 23 to be slid out of the enclosure onto an adjacent supporting structure or vehicle (e.g., maintenance inspection platform or other suitable structure), or the platform 103 and DDU 23 may be accessed through the access doors 45 of the enclosure 21 by a lifting mechanism (e.g., a forklift, crane, or other suitable lifting mechanism) to fully remove the DDU from the enclosure. The various method steps described herein for the method of positioning or removing the DDU 23 may be otherwise performed in an alternative order or simultaneously, or more or less steps may be used without departing from the scope of the disclosure.

FIGS. 7-10 illustrates a second embodiment of a DDU positioner assembly or system 201 for positioning the direct drive unit 23 housed in the enclosure 21. In the illustrated embodiment, the DDU 23 includes a gas turbine engine 25 and a gearbox 27 identical to the first embodiment of the disclosure, but the DDU positioner assembly 201 may be used to position a DDU that is alternatively configured without departing from the disclosure. As such, like or similar reference numbers will be used to describe identical or similar features between the two embodiments.

In one embodiment, the DDU positioner assembly 201 includes a platform 203 that supports the gearbox 27 and has a top surface 205, a bottom surface 207, two sides 208, and two ends 210. The gearbox 27 is fixedly mounted to the top surface 205 of the platform 203. The platform 203 is slidably mounted on the base 41 of the enclosure 21 with the bottom surface 207 of the platform being in slidable engagement with the floor of the enclosure. In a first or operating position (FIGS. 7 and 8A) of the direct drive unit 23, the platform 203 is fixedly attached to the base 41 by a plurality of fasteners 211. Upon removal of the fasteners 211, the platform 203 is capable of slidable movement with respect to the base 41. The platform 203 is connected to the support structure 127 of the gearbox 27 so that the drive unit 23 moves with the platform. In one embodiment, the platform 203 has two lifting openings 215, 217 extending between respective sides 208 of the platform. As shown in FIG. 7, the lifting opening 215 towards the front of the gearbox 27 (closest to the drive shaft flange 50) is spaced a first distance D1 from a centerline CT of the gearbox and the lifting opening 217 towards the rear of the gearbox (closest to the gas turbine engine 25) is spaced a second distance from the centerline CT of the gearbox, with the distance D2 being greater than the distance D2. The rear lifting opening 217 is farther from the centerline CT of the gearbox 27 because of the cantilever mounted gas turbine engine 25 that shifts the center of gravity of the DDU 23 from the centerline CT of the gearbox in the longitudinal direction toward the gas turbine engine. The platform 203 may be otherwise configured and/or arranged without departing from the scope of the disclosure.

In one embodiment, the DDU positioner assembly 201 includes a lubricator or lubrication system 221 (FIG. 9) to convey lubricant (e.g., grease or other suitable lubricant) from a lubricant reservoir 244 to a location between the bottom surface 207 of the platform 201 and the base 41 of the enclosure. The DDU positioner assembly 201 includes a lubrication portion 225 (FIG. 10) of the base 41 below the platform 203. As shown in FIG. 10, the portion 225 of the base 41 includes a plurality of lubrication grooves 227. The lubrication grooves 227 are in fluid communication with the lubricator 221 so that the lubricator provides lubricant to the grooves to facilitate sliding engagement between the platform 203 and the portion 225 of the base 41. The lubricator 221 includes a source of lubricant 244, tubing 243, and other required components (e.g., pump, controls, etc.) for delivering the lubricant to the lubrication portion 225 at a sufficiently high pressure for lubricant to fill the grooves 227 of the lubrication portion 225. In one embodiment, the lubricator 221 may be an automatic lubricator such as a model TLMP lubricator available from SKF Corporation, or the lubricator may be any other suitable lubricator including other automatic lubricators or manual lubricators without departing from the scope of the disclosure. In one embodiment, the lubrication portion 225 of the base 41 is an integral portion with the base or the floor of the enclosure 21, but the lubrication portion 225 may be a separate pad or component that is mounted between the base and the platform without departing from the disclosure. The lubricator 221 may be mounted inside the enclosure 21 or at least partially outside the enclosure without departing from the scope of the disclosure.

In one embodiment, the DDU positioner assembly 201 includes drive fasteners 241 mounted at one end 210 of the platform 203. In the illustrated embodiment, the drive fasteners 241 include a bracket 245 mounted to the floor 41 of the enclosure 21 and an impact screw 247 operatively connected to the bracket and the platform 203. The drive fasteners 241 may have other components and be otherwise arranged without departing from the disclosure. Further, more or less than two drive fasteners 241 may be provided without departing from the disclosure.

Figure 8A:
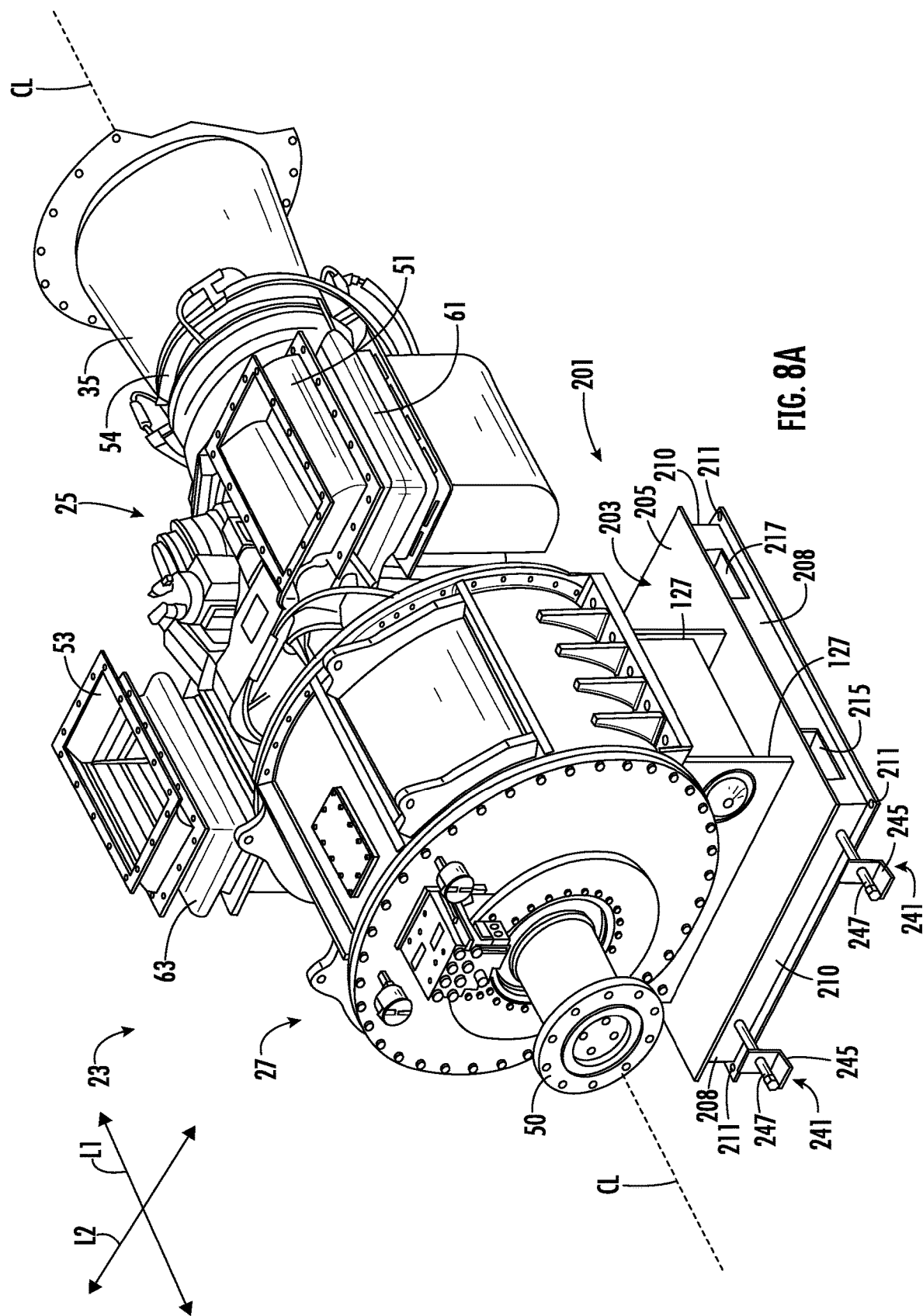
FIG. 8A is a perspective view of the DDU of FIG. 7 in a first position according to a second embodiment of the disclosure.
Figure 8B:
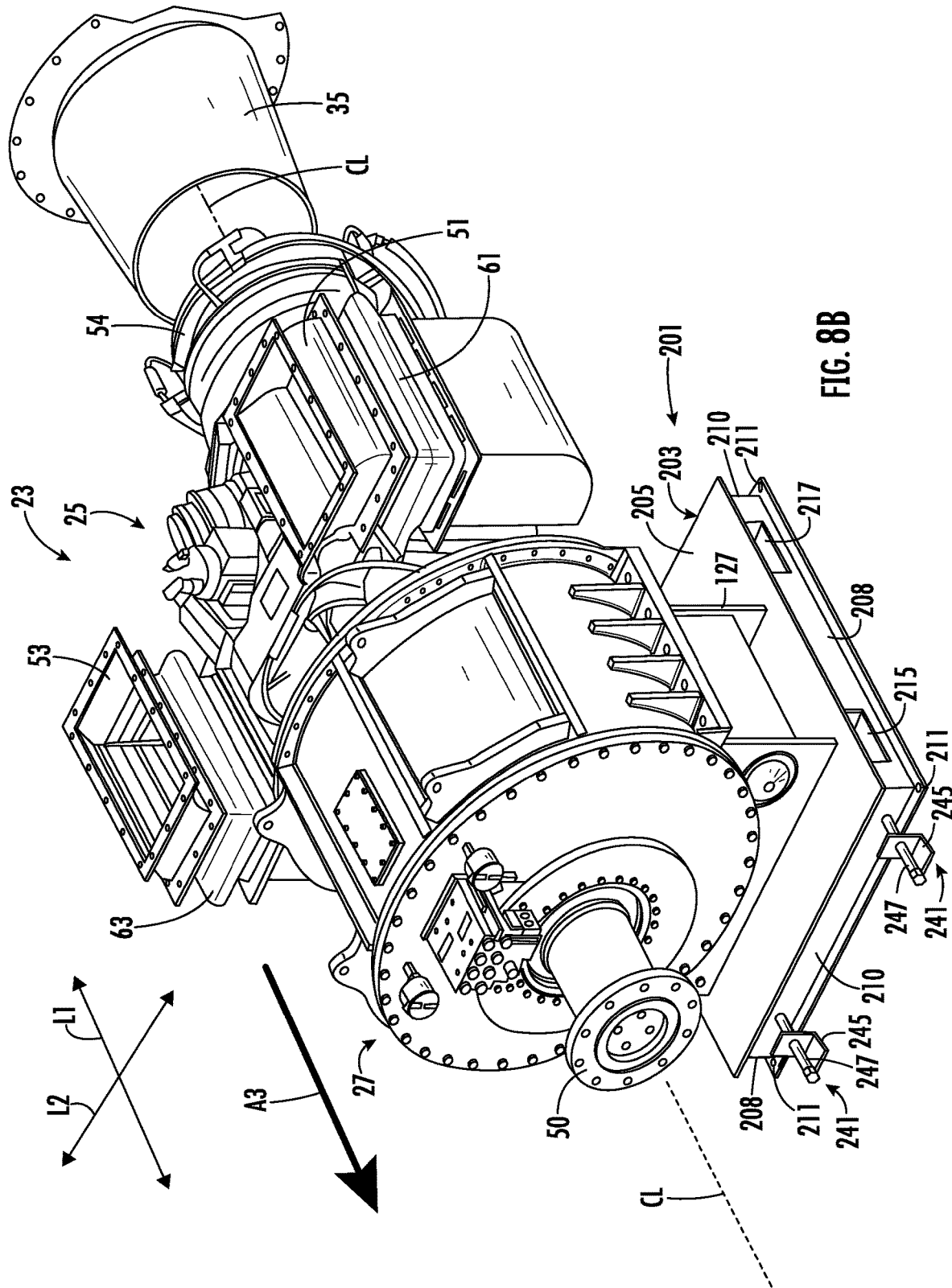
FIG. 8B is a perspective view of the DDU of FIG. 8A moved to a second position according to a second embodiment of the disclosure.
Figure 8C:
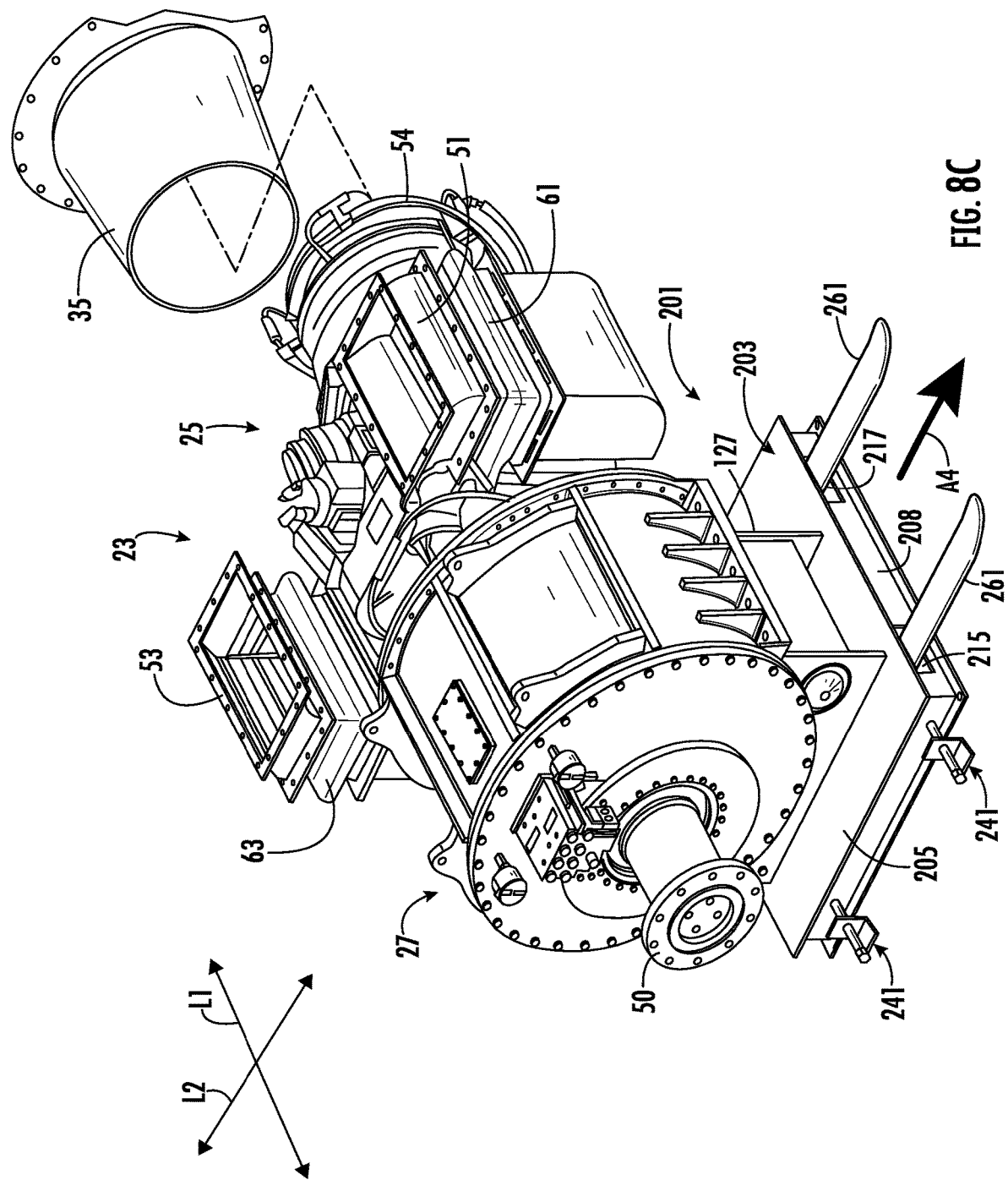
FIG. 8C is a perspective view of the DDU of FIG. 8B moved to a third position according to a second embodiment of the disclosure.
Figure 9:
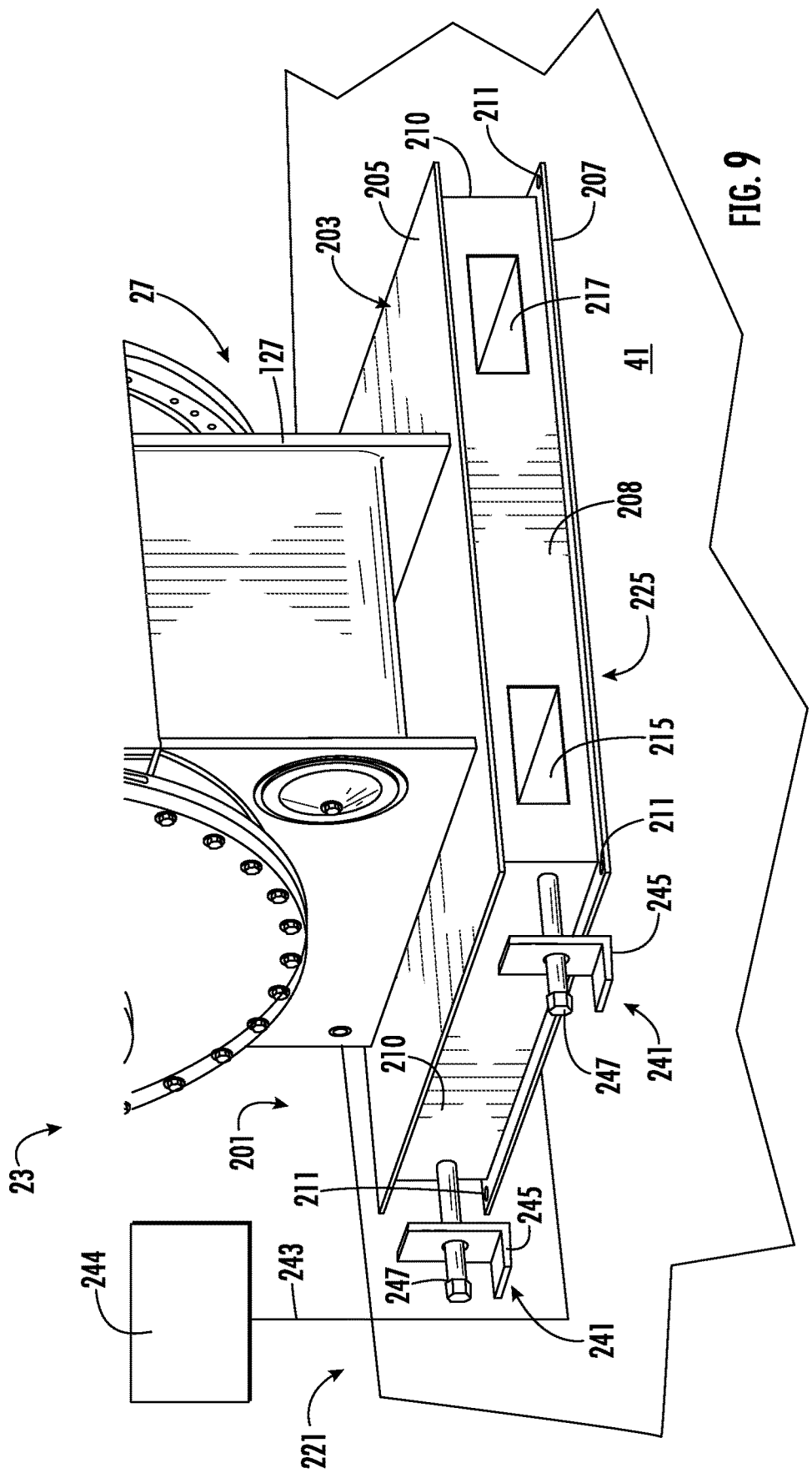
FIG. 9 is an enlarged detail of a portion of the DDU positioner assembly according to a second embodiment of the disclosure.
Figure 10:
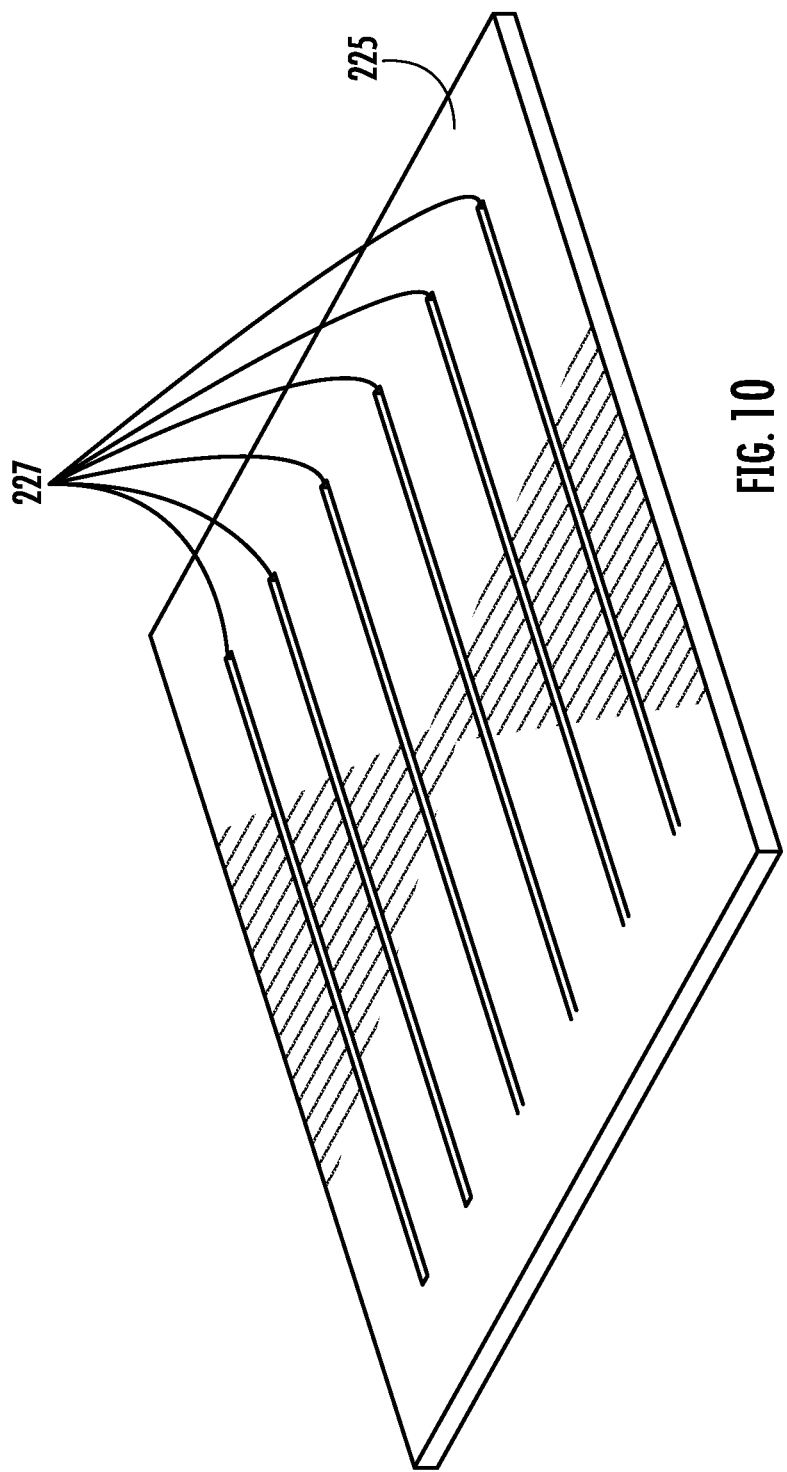
FIG. 10 is a detail of a portion of the DDU positioner assembly according to a second embodiment.

FIGS. 8A-9 illustrate an exemplary method of removing the DDU 23 from the enclosure 21 utilizing the DDU positioner assembly 201 of the second embodiment. The method is similar to the method of the first embodiment, in that the gas turbine engine 25 is disconnected from the air inlet ducting 37, the air exhaust ducting 35, and from other corresponding connections and components in a similar manner as discussed above for the first embodiment so that the gas turbine engine is free to move without damaging any of the operational connections and components needed for operation of the gas turbine engine. Further, the gearbox 27 is disconnected from the driveshaft 31 in a similar manner as the first embodiment, so that the DDU 23 has clearance for movement in the longitudinal direction L1 without interference with the driveshaft.

FIG. 8A shows the direct drive unit 23 in the first/operating position. Once the gas turbine engine 25 is disconnected from the respective components and connections and the gearbox 27 is disconnected from the driveshaft 31 and any other connections, the DDU positioner assembly 201 is operated to position the DDU 23 for withdrawal from the enclosure 21. First, the fasteners 211 fixedly attaching the platform 203 to the base 41 are removed. The lubricator 221 is operated to convey lubricant to the lubrication grooves 227 of the lubrication portion 225 of the base 41. After a sufficient amount of lubrication is located between the platform 203 and the lubrication portion 225 of the base 41, the drive fasteners 241 may be operated to move the platform 203 in the longitudinal direction L1 to a second position (FIG. 8B). As the impact screws 247 of the drive fasteners 241 are turned, the platform 203 is slid in the longitudinal direction L1 in the direction of arrow A3 (FIG. 8B). The lubricant provided in the lubrication grooves 227 and between the lubrication portion 225 and the bottom surface 207 of the platform reduces the sliding friction and allows the rotation of the impact screws 247 in the bracket 245 to advance the platform in the direction of arrow A3. The platform 203 is moved in the direction of arrow A3 a sufficient amount to allow access to the lifting openings 215, 217 by a lifting mechanism (e.g., forklift) 261 (FIG. 8C). The lifting mechanism 261 may include a forklift or other lifting mechanism that may access the interior 46 of the enclosure through the enclosure access doors 45. The lifting mechanism 261 is inserted into the lifting openings 215, 217 of the platform 203, and the DDU 23 is lifted and/or slid in the direction of arrow A4. The lifting mechanism 261 may move the DDU 23 to the third position (FIG. 8C), or transfer the DDU onto an adjacent supporting structure or vehicle (e.g., maintenance inspection platform or other suitable structure), or completely remove the platform 203 and DDU 23 from the enclosure. The various method steps described herein for the method of positioning or removing the DDU 23 by operating the DDU positioner assembly 201 may be otherwise performed in an alternative order or simultaneously, or more or less steps may be used without departing from the scope of the disclosure.

Figure 11:
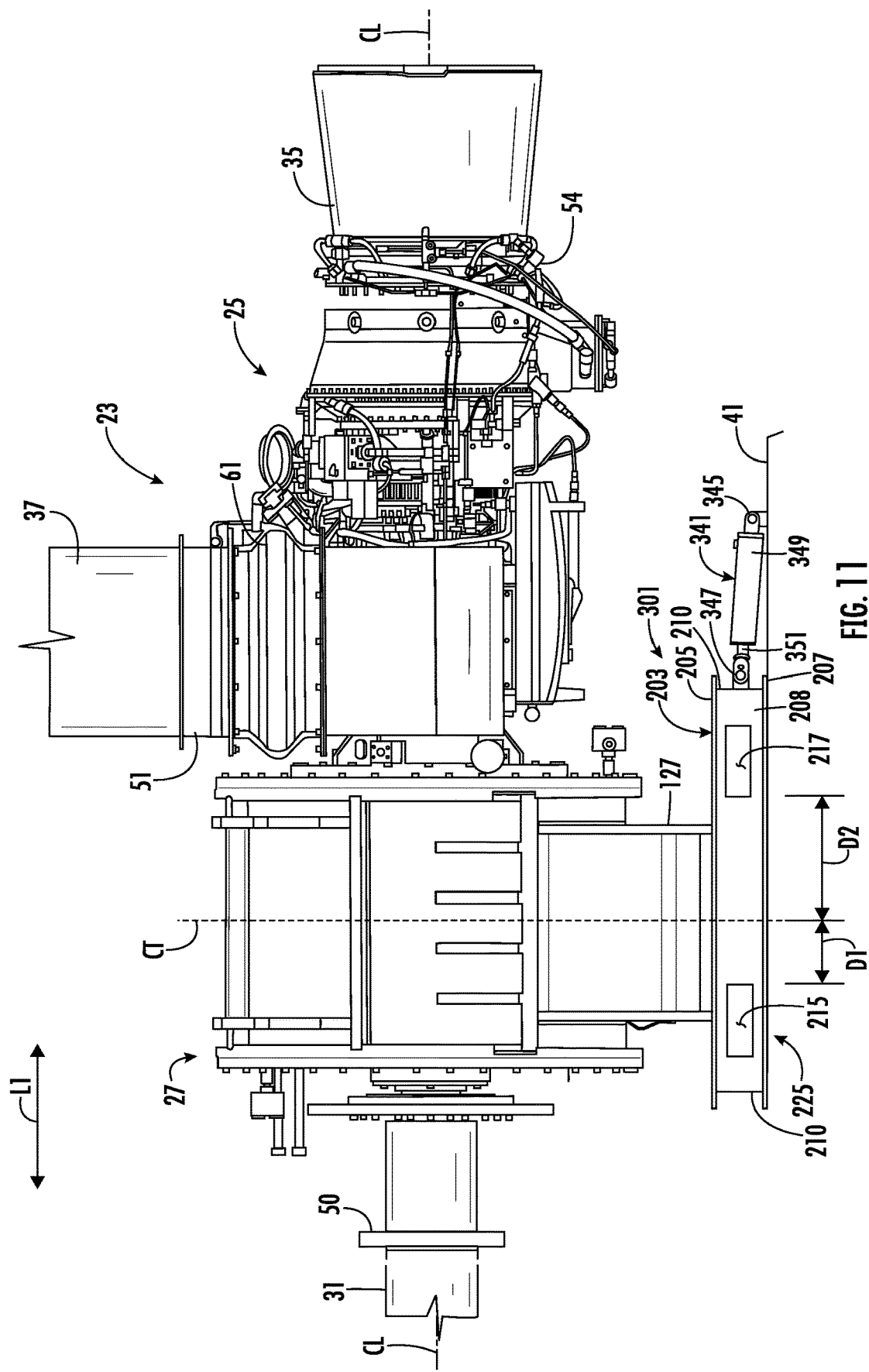
FIG. 11 is a side elevation view of the DDU mounted on a DDU positioner assembly according to a third embodiment of the disclosure.
Figure 12A:
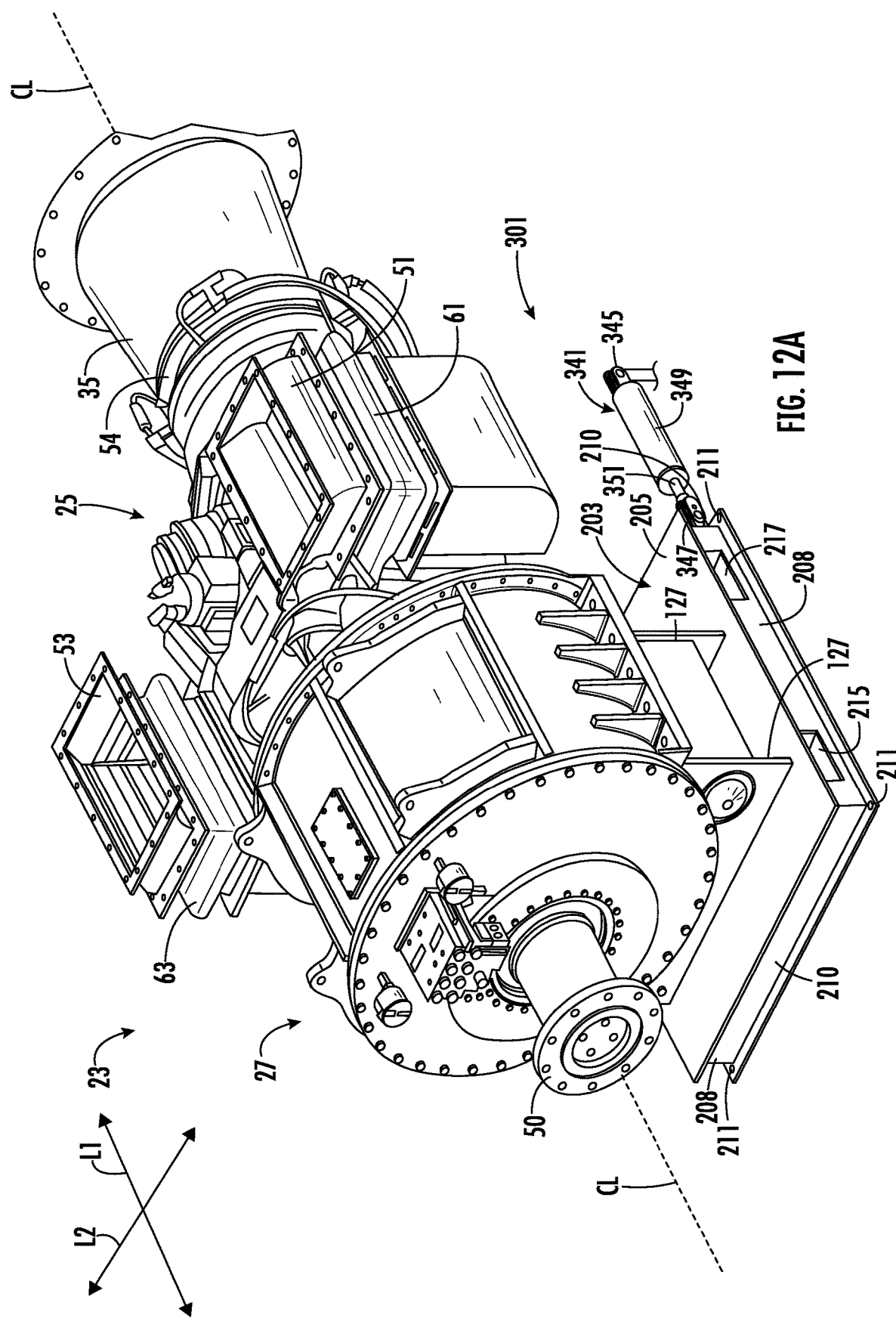
FIG. 12A is a perspective view of the DDU of FIG. 11 in a first position according to a third embodiment of the disclosure.
Figure 12B:
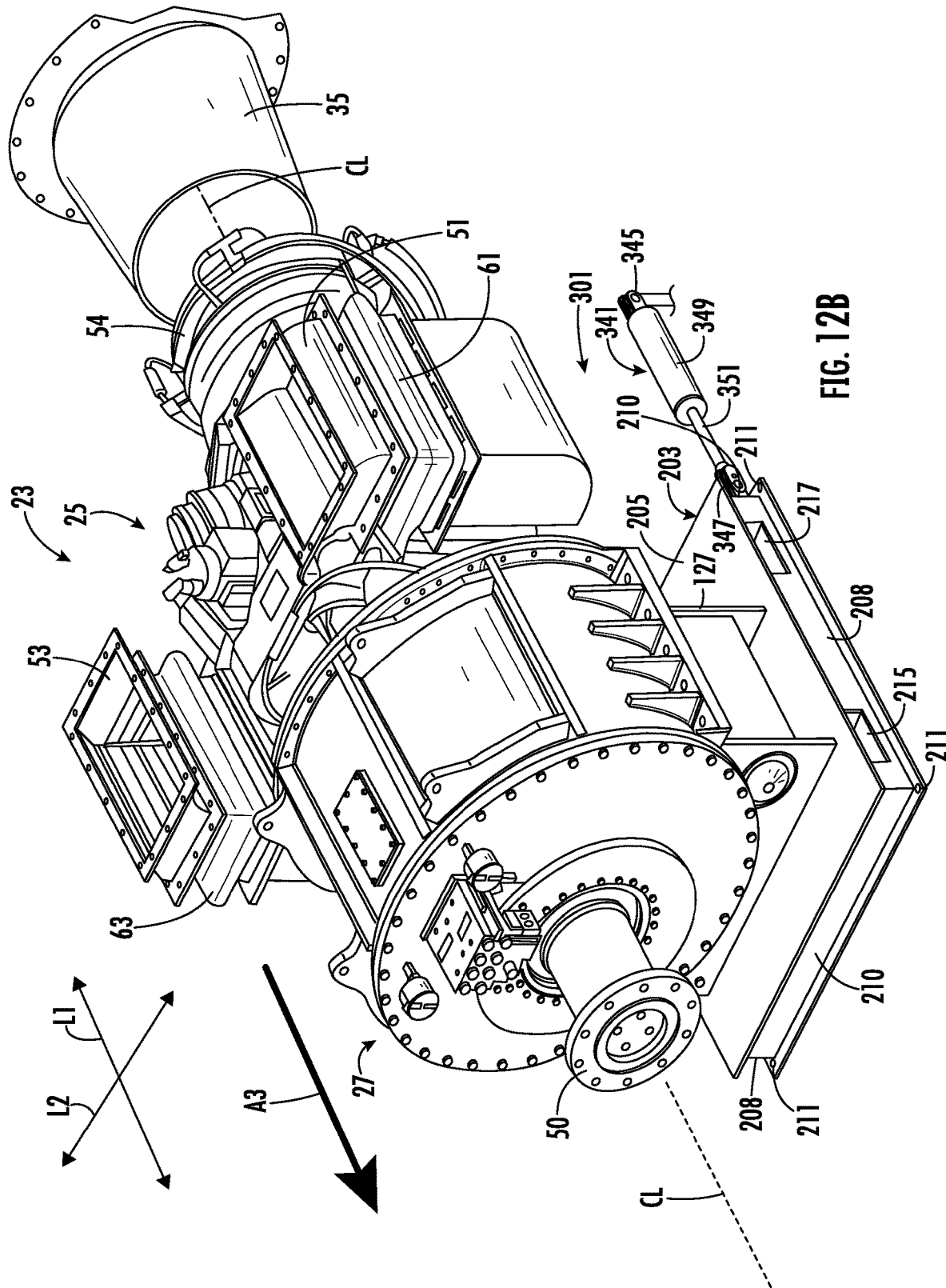
FIG. 12B is a perspective view of the DDU of FIG. 12A moved to a second position according to a third embodiment of the disclosure.
Figure 12C:
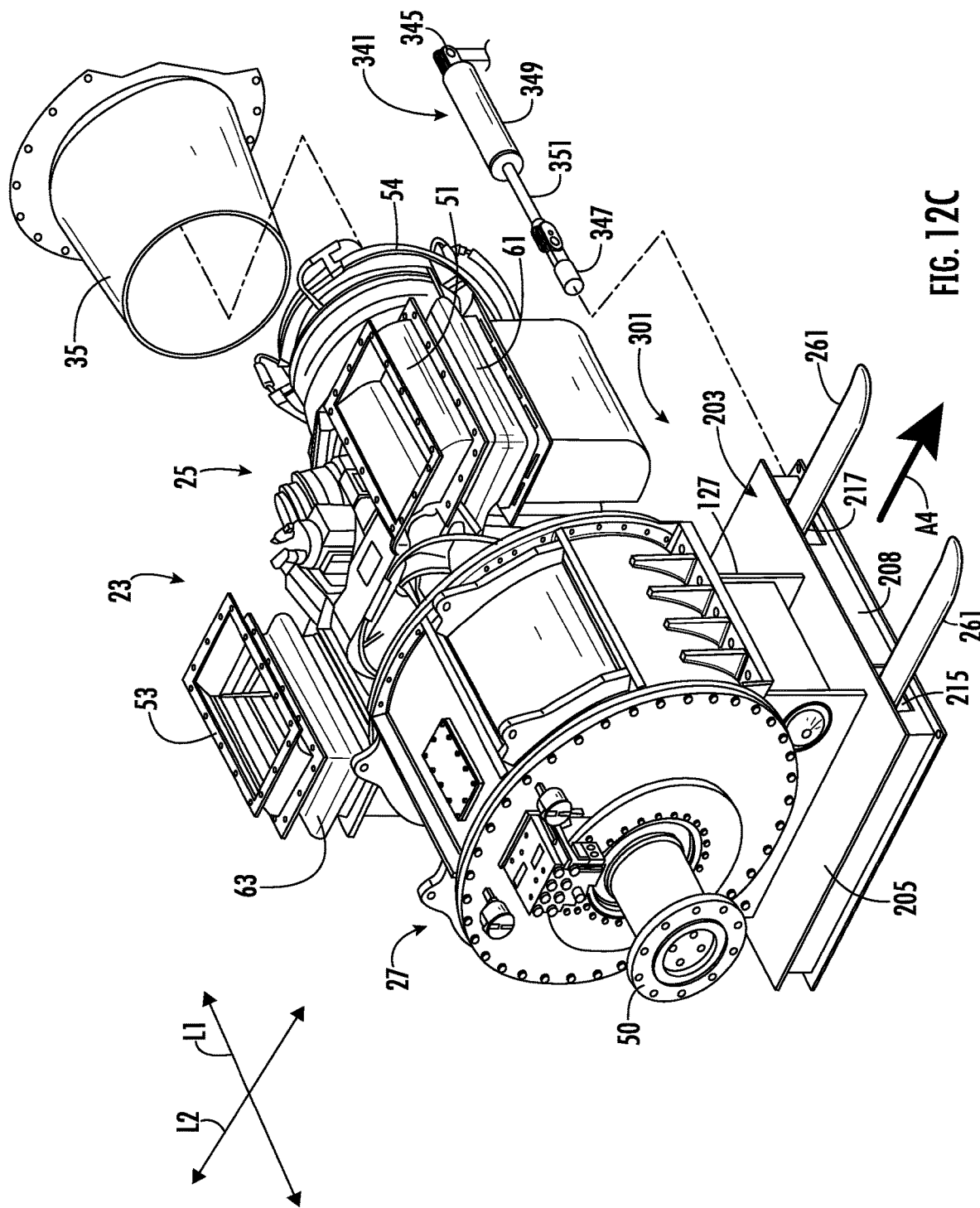
FIG. 12C is a perspective view of the DDU of FIG. 12B moved to a third position according to a third embodiment of the disclosure.

FIGS. 11-12C illustrate a third embodiment of a DDU positioner assembly or system 301 for positioning the direct drive unit 23 housed in the enclosure 21. In the illustrated embodiment, the DDU 23 includes a gas turbine engine 25 and a gearbox 27 identical to the first and second embodiments of the disclosure, but the DDU positioner assembly 301 may be used to position a DDU that is alternatively configured without departing from the disclosure as will be understood by those skilled in the art. The DDU positioner assembly 301 is generally similar to the DDU positioner assembly 201 of the second embodiment, except the drive fasteners 241 have been removed and an actuator 341 is added to the DDU positioner assembly of the third embodiment. As such, like or similar reference numbers will be used to describe identical or similar features between the second and third embodiments.

As shown in FIG. 11, the DDU positioner assembly 301 includes the actuator 341 that has a first end 345 connected to the base 41 of the enclosure 21 and a second end 347 connected to the end 210 of the platform 203. In one embodiment, the actuator 341 is a hydraulic cylinder that has a piston rod 351 that is extendible from a cylinder body 349 upon operation of the actuator. The actuator 341 may be controlled by a manual control valve or the actuator may be configured for remote operation by connection to corresponding automated control valves. In the illustrated embodiment, one actuator 341 is shown, but the DDU positioner assembly 301 may include more than one actuator without departing from the scope of the disclosure. Further, the actuator 341 may be otherwise located for attachment to the platform 203 without departing from the scope of the disclosure.

FIGS. 12A-12C illustrate an exemplary method of removing the DDU 23 from the enclosure 21 utilizing the DDU positioner assembly 301 of the second embodiment. The method is similar to the method of the utilizing the DDU positioner assembly 201 of the second embodiment, in that the gas turbine engine 25 is disconnected from the air inlet ducting 37, the air exhaust ducting 35, and from other corresponding connections and components in a similar manner as discussed above for the first embodiment so that the gas turbine engine is free to move without damaging any of the operational connections and components needed for operation of the gas turbine engine. Further, the gearbox 27 is disconnected from the driveshaft 31 in a similar manner as the first embodiment, so that the DDU 23 has clearance for movement in the longitudinal direction L1 without interference with the driveshaft. Also, the DDU positioner assembly 301 of the third embodiment includes the lubricator 221 (FIG. 9) for providing lubrication to lubrication grooves 227 of the lubrication portion 225 of the base 41 to facilitate sliding of the platform 203 in the longitudinal direction L1, so that the DDU positioner assembly of the third embodiment operates in a similar manner as the DDU positioner assembly 201 of the second embodiment.

FIG. 12A shows the direct drive unit 23 in the first/operating position. Once the gas turbine engine 25 is disconnected from the respective components and connections, and the gearbox 27 is disconnected from the driveshaft 31 and any other connections, the DDU positioner assembly 301 is operated to position the DDU 23 for withdrawal from the enclosure 21. First, the fasteners 211 fixedly attaching the platform 203 to the base 41 are removed. The lubricator 221 is operated to convey lubricant to the lubrication grooves 227 of the lubrication portion 225 of the base 41. After a sufficient amount of lubrication is located between the platform 203 and the lubrication portion 225 of the base 41, the actuator 341 may be operated to move the platform 203 in the longitudinal direction L1 to a second position (FIG. 12B). The extension of the piston rod 351 of the actuator 341 exerts a force on the platform 203 to slide the platform in the longitudinal direction L1 in the direction of arrow A3 (FIG. 12B). The lubricant provided in the lubrication grooves 227 and between the lubrication portion 225 and the bottom surface 207 of the platform reduces the sliding friction and allows the actuator 341 to advance the platform in the direction of arrow A3. As with the previous embodiment, the platform 203 is moved in the direction of arrow A3 a sufficient distance to allow access to the lifting openings 215, 217 by a lifting mechanism (e.g., forklift) 261 (FIG. 8C). The lifting mechanism 261 may include a forklift or other lifting mechanism that may access the interior 46 of the enclosure through the enclosure access doors 45. The lifting mechanism 261 is inserted into the lifting openings 215, 217 of the platform 203, and the DDU 23 is lifted and/or slid in the direction of arrow A4. Prior to moving the platform 203 in the direction of arrow A4, the actuator 341 may be disconnected from the platform (FIG. 12C) with the first end 347 of the actuator being separated from the platform and the second end 345 of the actuator remaining attached to the floor 41 of the enclosure. Alternatively, the second end 345 of the actuator 341 may be disconnected from the floor 41 of the enclosure and the first end 341 of the actuator may remain attached to the platform 203, or both ends of the actuator may be disconnected and the actuator removed without departing from the enclosure.

The lifting mechanism 261 may move the DDU 23 to the third position (FIG. 12C), or transfer the DDU onto an adjacent supporting structure or vehicle (e.g., maintenance inspection platform or other suitable structure), or completely remove the platform 203 and DDU 23 from the enclosure. The various method steps described herein for the method of positioning or removing the DDU 23 by operating the DDU positioner assembly 301 may be otherwise performed in an alternative order or simultaneously, or more or less steps may be used without departing from the scope of the disclosure.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto; the embodiments of the disclosure may be practiced other than as specifically described.

This application is a continuation of U.S. Non-Provisional application Ser. No. 17/671,734,filed Feb. 15, 2022, titled "DIRECT DRIVE UNIT REMOVAL SYSTEM AND ASSOCIATED METHODS," which is a continuation of U.S. Non-Provisional application Ser. No. 17/204,338, filed Mar. 17, 2021, titled "DIRECT DRIVE UNIT REMOVAL SYSTEM AND ASSOCIATED METHODS," which is a continuation of U.S. Non-Provisional application Ser. No. 17/154,601, filed Jan. 21, 2021, titled "DIRECT DRIVE UNIT REMOVAL SYSTEM AND ASSOCIATED METHODS," now U.S. Pat. No. 10,982,596, issued Apr. 20, 2021, which is a divisional of U.S. Non-Provisional application Ser. No. 17/122,433, filed Dec. 15, 2020, titled "DIRECT DRIVE UNIT REMOVAL SYSTEM AND ASSOCIATED METHODS," now U.S. Pat. No. 10,961,912, issued Mar. 30, 2021, which is a divisional of U.S. Non-Provisional application Ser. No. 15/929,924, filed May 29, 2020, titled "DIRECT DRIVE UNIT REMOVAL SYSTEM AND ASSOCIATED METHODS," now U.S. Pat. No. 10,895, 202, issued Jan. 19, 2021, which claims the benefit of and priority to U.S. Provisional Application No. 62/899,975, filed Sep. 13, 2019, titled "TURBINE REMOVAL SYSTEM," the entire disclosures of which are incorporated herein by reference.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A method of positioning a direct drive unit (DDU) comprising a gearbox connected to a turbine engine, housed in an enclosure for removal from an enclosure housing, the method comprising:
    providing a DDU positioner assembly including a platform configured to support the gearbox and the turbine engine and a lubricator, the lubricator configured to convey a lubricant to a location between a lower portion of the platform and a base of the enclosure to facilitate movement of the platform relative to the enclosure base, the platform connected to at least one of the gearbox and the turbine engine;
    applying the lubricant between the lower portion of the platform and the enclosure base;
    detaching one or more fasteners to an unfastened position to allow movement of the DDU relative to the enclosure;
    positioning a lift mechanism in a position to lift the DDU; and
    lifting the DDU with the lift mechanism to thereby remove the DDU from the enclosure housing.

2. The method as defined in claim 1 wherein the DDU positioner assembly further includes one or more drive fasteners in contact with the platform on which the DDU is mounted, the one or more drive fasteners being operable to initiate sliding movement of the platform along the enclosure base to position one or more lift openings for access by the lifting mechanism, wherein the platform comprises a first surface supporting the one or more of the gearbox or the turbine engine, and the lower portion being in moveable engaged with the enclosure base, and wherein the one or more drive fasteners are operatively connected to the platform.

3. The method as defined in claim 2, wherein the enclosure base includes a lubrication portion of a floor of the enclosure, the lubrication portion having one or more lubrication grooves and being operably connected to the lubricator, and the method further comprises sliding the platform for movement in a selected direction.

4. A direct drive unit (DDU) positioner assembly for positioning a DDU housed in an enclosure for removal from the enclosure, the enclosure having an enclosure base, the DDU positioner assembly comprising: a platform configured to connect to a support of a gearbox when positioned adjacent thereto and mounted on the enclosure base, the enclosure base having one or more lubrication grooves configured to receive a lubricant to facilitate movement of the platform relative to the enclosure base in a selected direction; and a lubricator to convey the lubricant to the one or more lubrication grooves, and the platform having a plurality of fasteners to secure the platform to the enclosure base.

5. The DDU positioner assembly as defined in claim 4, further comprising one or more lift openings for access by a lifting mechanism, wherein the one or more lift openings comprise a first lift opening and a second lift opening, the first lift opening being spaced apart from a centerline of the gearbox by a first distance, the second lift opening being spaced apart from the centerline of the gearbox by a second distance, the second distance being greater than the first distance, and wherein the second lift opening is positioned closer to a turbine engine of the DDU than the first lift opening.

6. The DDU positioner assembly of claim 5, further comprising one or more drive fasteners in contact with the platform, the one or more drive fasteners being operable to initiate sliding movement of the platform along the enclosure base to position the one or more lift openings for access by the lifting mechanism, wherein the platform comprises an upper surface supporting the gearbox, a lower surface in moveable engagement with the enclosure base, two sides, and two ends, the one or more lift openings extending in a lateral direction through the two sides of the platform, and wherein the one or more drive fasteners are operatively connected to one of the ends of the platform and are operable to initiate the sliding movement of the platform in a longitudinal direction.

7. The DDU positioner assembly of claim 4, wherein the enclosure base includes a lubrication portion of a floor of the enclosure, the lubrication portion having the one or more lubrication grooves and being operably connected to the lubricator, and wherein the enclosure base comprises a removable pad secured to the floor of the enclosure, the removable pad having the lubrication grooves fluidly connected to the lubricator.

8. The DDU positioner assembly of claim 5, further comprising one or more actuators operatively connected to the platform, the one or more actuators being operable to initiate sliding movement of the platform along the enclosure base to position the one or more lift openings for access by the lifting mechanism, wherein the platform includes an upper surface supporting the gearbox, a lower surface in moveable engagement with the enclosure base, two sides, and two ends, the one or more lift openings extending in a lateral direction through the two sides of the platform, and wherein the one or more actuator is operatively connected to one of the ends of the platform and is operable to initiate the movement of the enclosure base in a longitudinal direction.

9. A direct drive unit (DDU) positioner assembly for positioning a DDU housed in an enclosure for removal from the enclosure, the DDU including a gearbox and an engine connected to the gearbox, the enclosure having an enclosure base, the DDU positioner assembly comprising:
a platform configured to connect to a support of the gearbox when positioned adjacent thereto and mount on the enclosure base, the enclosure base configured for facilitating movement of the platform relative to the enclosure base, the platform having a plurality fasteners to secure the platform to the enclosure base;
a lubricator to convey lubricant to a location between a lower portion of the platform and the enclosure base to facilitate enhanced movement of the platform relative to the enclosure base; and
one or more actuators operatively connected to the platform and actuators being operable to initiate the movement of the platform along the enclosure base to position for access by a lifting mechanism,
the platform further including an upper surface supporting the gearbox and the lower portion being in moveable engagement with the enclosure base, and the one or more actuators being operatively connected to the platform and being operable to initiate movement of the enclosure base in a selected direction.

10. The DDU positioner assembly of claim 9, wherein the enclosure base further includes a lubrication portion of a floor of the enclosure and being operably connected to the lubricator.

11. The DDU positioner assembly of claim 10, further comprising one or more drive fasteners in contact with the platform, the one or more drive fasteners being operable to initiate the movement of the platform along the enclosure base to position for access by the lifting mechanism, and wherein the one or more drive fasteners are operatively connected to the platform and are operable to initiate movement of the platform in a longitudinal direction.

* * * * *